US008599489B2

(12) United States Patent
Shalaev et al.

(10) Patent No.: US 8,599,489 B2
(45) Date of Patent: Dec. 3, 2013

(54) NEAR FIELD RAMAN IMAGING

(75) Inventors: Vladimir M. Shalaev, West Lafayette, IN (US); Alexander P. Kildishev, West Lafayette, IN (US); Vladimir P. Drachev, West Lafayette, IN (US); Wenshan Cai, Sunnyvale, CA (US)

(73) Assignee: Purdue Research Foundation, West Lafayette, IN (US)

(*) Notice: Subject to any disclaimer, the term of this patent is extended or adjusted under 35 U.S.C. 154(b) by 935 days.

(21) Appl. No.: 12/449,604

(22) PCT Filed: Feb. 26, 2008

(86) PCT No.: PCT/US2008/002482
§ 371 (c)(1),
(2), (4) Date: Feb. 18, 2010

(87) PCT Pub. No.: WO2008/133769
PCT Pub. Date: Nov. 6, 2008

(65) Prior Publication Data
US 2010/0134898 A1    Jun. 3, 2010

Related U.S. Application Data

(60) Provisional application No. 60/903,496, filed on Feb. 26, 2007.

(51) Int. Cl.
*G02B 3/12* (2006.01)
*G02B 3/00* (2006.01)

(52) U.S. Cl.
USPC ............................................ 359/665; 359/642

(58) Field of Classification Search
USPC .............................................. 359/642, 665–667
See application file for complete search history.

(56) References Cited

U.S. PATENT DOCUMENTS

| 2004/0150818 | A1 | 8/2004 | Armstrong et al. |
| 2005/0221507 | A1 | 10/2005 | Koo et al. |
| 2006/0257090 | A1 | 11/2006 | Podolskiy et al. |
| 2010/0033725 | A1* | 2/2010 | Quesnel et al. ............... 356/445 |

* cited by examiner

*Primary Examiner* — Scott J Sugarman
(74) *Attorney, Agent, or Firm* — Hiscock & Barclay, LLP; Christopher J. White

(57) ABSTRACT

A tunable super-lens (TSL) for nanoscale optical sensing and imaging of bio-molecules and nano-manufacturing utilizes negative-index materials (NIMs) that operate in the visible or near infrared light. The NIMs can create a lens that will perform sub-wavelength imaging, enhanced resolution imaging, or flat lens imaging. This new TSL covers two different operation scales. For short distances between the object and its image, a near-field super-lens (NFSL) can create or enhance images of objects located at distances much less than the wavelength of light. For the far-zone, negative values are necessary for both the permittivity $\in$ a permeability $\mu$. While well-structured periodic meta-materials, which require delicate design and precise fabrication, can be used, metal-dielectric composites are also candidates for NIMs in the optical range. The negative-refraction in the composite films can be made by using frequency-selective photomodification.

7 Claims, 18 Drawing Sheets

NEAR FIELD RAMAN IMAGING

STATEMENT REGARDING U.S. FEDERALLY SPONSORED RESEARCH OR DEVELOPMENT

The U.S. government has a paid-up license in this invention and the right in limited circumstances to require the patent owner to license others on reasonable terms as provided for by the terms of STTR Award Number PR 10122006 awarded by the Army Research Office.

BACKGROUND OF THE INVENTION

The present invention is directed to slab lenses developed from negative index of refraction materials (NIM) constructed from metal-dielectric composites and methods for their construction using frequency-selective photomodification.

Modern manufacturing techniques have led to significant developments in the capabilities of optical lenses and related imaging tools providing researchers and drug developers with insightful information about general features of various substances and materials. However, even today's most sophisticated lens is only capable of producing images with a limited spatial resolution, which means that the dimensions of observed objects can not be smaller than the half-wavelength of illuminating light This restriction (diffraction limit) is fundamental and cannot be avoided by traditional methods in standard microscopic optical systems, where an image of object is observed through a system of lenses. Current technology that allows the sub-wavelength optical resolution is based on near-field scanning optical microscope (NSOM). This technology does also have its own limitations, since NSOM uses nanoscale optical probes attached to a sophisticated positioning system and can only work in close proximity to the objects, at distances much smaller than the wavelength.

The refractive index is the most fundamental parameter to describe the interaction of electromagnetic radiation with matter. It is a complex number n=n'+in" where n' has generally been considered to be positive. While the condition n'<0 does not violate any fundamental physical law, materials with negative index have some unusual and counter-intuitive properties. For example, light, which is refracted at an interface between a positive and a negative index material, is bent in the "wrong" way with respect to the normal, group- and phase velocities are anti-parallel, wave- and Pointing vectors are anti-parallel, and the vectors $\vec{E}$, $\vec{H}$, and $\vec{k}$ form a left-handed system. Because of these properties, such materials are synonymously called "left handed" or negative-index materials. Theoretical work on negative phase velocity dates back to Lamb (in hydrodynamics) [1] or Schuster (in optics) [2] and was considered in more detail by Mandel'shtam [3] and Veselago [4]. A historical survey referring to these and other early works has been set forth by Holloway et al. [5].

In general, left handed materials do not exist naturally, with some rare exceptions like bismuth that shows n'<0 at a wavelength of $\lambda \approx 60$ μm [6]. However, no naturally existing negative index material is known so far in the optical range of frequencies. Therefore, it is necessary to turn to man made, artificial materials which are composed in such a way that the averaged (effective) refractive index is less than zero: $n'_{eff}$<0. Such a material can be obtained using photonic crystals (PC) [7-11]. However in this case, the interior structure of the material is not sub-wavelength. Consequently, PCs do not show the full range of possible benefits of left handed materials. For example, super-resolution, which has been predicted by Pendry [12], is not achievable with photonic band gap materials because their periodicity is in the range of the wavelength $\lambda$. A thin slab of a photonic crystal only restores small k-vector evanescent field components because the material can be considered as an effective medium only for long wavelengths, and large k-vector components are not restored [13-15]. A truly effective refractive index $n'_{eff}$<0 can be achieved in metamaterials with structural dimensions far below the wavelength. Metamaterials for optical wavelengths must therefore be nano-crafted.

A possible—but not the only—approach to achieve a negative refractive index is to design a material where the (isotropic) permittivity $\in=\in'+i\in''$ and the (isotropic) permeability $\mu=\mu'+i\mu''$ obey the equation $$\in'|\mu|+\mu'|\in|<0. \quad (1)$$

This leads to a negative real part of the refractive index $n=\sqrt{\in\mu}$ [16]. Equation 1 is satisfied, if $\in'<0$ and $\mu'<0$. However, we note that this is not a necessary condition. There may be magnetically active media (i.e., $\mu \neq 1$) with a positive real part $\mu'$ for which Eq. 1 is fulfilled and which therefore show a negative $n'$.

Previously one has considered only isotropic media where $\in$ and $\mu$ are complex scalar numbers. It has been shown that in the case of anisotropic media, where $\in$ and $\mu$ are tensors, a negative refractive index is feasible even if the material shows no magnetic response ($\mu=1$). If, for example, $\in_\perp<0$ and $\in_\parallel>0$, then $n'<0$ can be achieved [6, 17]. Despite the fact that using anisotropic media is a very promising approach, we will not focus on that topic here. This is mainly because so far a negative index for optical frequencies has only been achieved following the approach of magnetically active media.

The first recipe how to design a magnetically active material was suggested by Pendry in 1999 [18]: Two concentric split rings that face in opposite directions and that are of subwavelength dimensions were predicted to give rise to $\mu'<0$. One can regard this as an electronic circuit consisting of inductive and capacitive elements. The rings form the inductances and the two slits as well as the gap between the two rings can be considered as capacitors. A magnetic field which is oriented perpendicular to the plane of drawing induces an opposing magnetic field in the loop due to Lenz's law. This leads to a diamagnetic response and hence to a negative real part of the permeability. The capacitors (the two slits and the gap between the rings) are necessary to assure that the wavelength of the resonance is larger than the dimensions of the split ring resonators (SRR).

Very soon after that theoretical prediction, Schultz and coworkers combined the SRR with a material that shows negative electric response in the 10 GHz range and consists of metallic wires in order to reduce the charge carrier density and hence shift the plasmonic response from optical frequencies down to GHz frequencies [19]. The outcome was the first-ever metamaterial with simultaneously negative real parts of the permeability and the permittivity [20] and consequently with a negative refractive index at approximately 10 GHz [21, 22]. From now on the race to push left handedness to higher frequencies was open. The GHz resonant SRRs had a diameter of several millimeters, but size reduction leads to a higher frequency response. The resonance frequency was pushed up to 1 THz using this scaling technique [23, 24].

An alternative to double SRRs is to fabricate only one SRR facing a metallic mirror and use it's mirror image as the second SRR [25]. The resonance frequency has been shifted to 50 THz using that technique. In order to increase the frequency even more, a simple further downscaling of the geometrical dimensions with wavelength becomes questionable because localized plasmonic effects must be considered. However, localized plasmons open a wide field of new design opportunities. For example, a double C-shaped SRR is not required any more. Originally, the double C-shaped structure was necessary in order to shift the resonance frequency to sufficiently low frequencies such that the requirement of sub wavelength dimension could be fulfilled. In the optical range, however, localized plasmons help to shift resonance frequencies to lower energies and consequently, the doubling of the split ring is not necessary at optical frequencies [26]. The first experimental proof that single SRRs show an electric response at 3.5 μm (85 THz) was given in 2004 by Linden and coworkers [27] and it was concluded that the magnetic response of single SRRs should be found at the same frequency. Meanwhile the electric resonance frequencies of single SRRs has even been pushed to the important telecom wavelength of 1.5 μm [28]. Other approaches of engineering metamaterials with magnetic activity that make use of localized plasmonic resonances, and abandon the classical split ring resonator shape completely, will be considered in the proposed work.

The "perfect" lens proposed by Pendry is among the most exciting applications regarding the NIMs, which have simultaneously negative real parts of permittivity $\in$ and permeability μ. Pendry predicted that a slab with refractive index n=−1 surrounded by air allows the imaging of objects with sub-wavelength precision by recovering both propagating and evanescent waves. The NIM at optical frequencies demonstrated by the present inventors ("the Shalaev group") recently paves the way in achieving the perfect lens in optics. However, commercially available optical NIMs are still far from the realization of a far-zone perfect lens because any realistic losses or impedance mismatch can eliminate the superlensing effect.

Provided that all of the dimensions of a system are much smaller than the wavelength, the electric and magnetic fields can be regarded as static and independent, and the requirement for superlensing of p-polarized waves (TM mode) is reduced to only $\in = -\in_h$, where $\in_h$ is the permittivity of the host medium interfacing the lens. A slab of silver in air illuminated at its surface plasmon resonance (where λ=340 nm and $\in = -1$) is a good candidate for such a NFSL. Experiments with silver slabs have already shown rapid growth of evanescent waves and imaging well beyond the diffraction limit. We note, however, that a NFSL can operate only at a single frequency ω satisfying the lens condition $\in'_m(\lambda_{op}) = -\in_h(\lambda_{op})$ which is indeed a significant drawback of a lens based on bulk metals.

In sharp contrast to pure metal slabs, metal-dielectric composite films are characterized by an effective permittivity $\in_\theta$ that depends critically on the permittivities and the filling factors of both the metal and dielectric components. As a result, for a given host medium, $\in_\theta = \in_\theta(\omega, p)$ may have the value of $-\in_h$ at practically any wavelength in the visible and NIR region. The wavelength corresponding to $R\theta(\in_\theta) = -\in_h$ depends on the structure of the composite and the material constants of the metal and dielectric components in the composite.

SUMMARY OF THE INVENTION

A tunable super-lens (TSL) is proposed for nanoscale optical sensing and imaging of bio-molecules and nano-manufacturing. The tunable super lens will utilize negative-index materials (NIMs) that operate in the visible or near infrared light. Preliminary results have indicated that these NIMs can create a lens that will perform sub-wavelength imaging, enhanced resolution imaging, or flat lens imaging. While negative index material (NIM) effects have been demonstrated in the area of microwave technology, no NIM has been developed that operates in the visible or near infrared state. Based on our preliminary tests, it has been shown that such a material could make a perfect lens, defined as a lens that can overcome the diffraction limit. This new TSL covers two different operation scales. For short distances between the object and its image, a near-field super-lens (NFSL) can create or enhance images of objects located at distances much less than the wavelength of light.

The studies to date have found that (1) the developed simulated annealing code dearly outperforms brute-force search and provides a required ultimate solution; (2) the hybrid FEM-SHA method (a unimoment solver) is very effective in truncating required finite-element domain (and also automatically provides far-field solution) in a linear and non-linear light scattering problems. Substantial focus has been made at the development of problem-specific modeling tools and techniques. As a result, the developed software built on the spatial harmonic analysis (SHA) substantially outperforms FDTD method in computational speed and is compatible in performance with finite-element method (FEM) with high-order elements and advanced multigrid solvers; this meshless SHA code (also referred as the Fourier-mode-matching (FMM) approach or the rigorous coupled wave analysis (RCWA)) is very effective in obtaining required near- and far-field expansions and therefore is instrumental for restoring equivalent refractive index at normal and oblique incidence. (In contrast to FEM, which is good for both linear and non-linear light scattering problems, the applications of the SHA are limited to linear problems only.) The novel technique provides accurate and fast calculations of highly resonant metal-dielectric composite materials, including the part of the optical range where the refractive index of the structure becomes negative.

For the far-zone, the negative values are necessary for both the permittivity $\in$ and permeability μ. All the optical-magnetic and negative index materials reported thus far are based on well-structured periodic metamaterials which requires delicate design and precise fabrication. Metal-dielectric composites are candidates for NIMs in the optical range. The negative-refraction in the composite films is made possible by using frequency-selective photomodification, a technique first suggested and tested by the Shalaev group.

It has been also crucial to understand the angular dependence of equivalent optical characteristics in order to quantify the use of such structures in potential applications. We examined the angular dependence of a particular geometry that shows a negative index relating the anisotropic properties of ONIM to the geometry of elementary cell. It has been found that the transition of the first order diffraction mode from evanescent regime to propagating regime can force the refractive index to switch from negative values back to positive values. The transition angle is given by the relation sin θ=(λ−d)/d, where d is the periodicity of the structure; the real part of the refractive index crosses over from negative to positive values approximately at the same angle. Once the first order diffraction mode starts propagating there is an additional flow of energy. The additional energy leakage reduces the local fields inside the coupled nano-strip structure and switches the refractive index to positive values. One method to overcome the problem is designing a structure with resonances at a wavelength much larger than the periodicity d.

Metal-dielectric nanostructures with magnetic resonators usually show low transmission due to reflection and absorption. We have successfully developed an impedance-matched design to suppress reflection. In our modeling and optimization studies we also added a gain material to compensate for losses and finally obtain a fully transparent layer of negative index metamaterial. Numerical simulations show that a composite material comprising silver strips and a gain providing material can have a negative refractive index and 100% transmission, simultaneously.

Other features of the present invention and the corresponding advantages of those features will be come apparent from the following discussion of the preferred embodiments of the present invention, exemplifying the best mode of practicing the present invention, which is illustrated in the accompanying drawings. The components in the figures are not necessarily to scale, emphasis instead being placed upon illustrating the principles of the invention.

BRIEF DESCRIPTION OF THE DRAWINGS

FIG. 3a is a graph of a required metal filling factor p for different wavelengths. FIG. 3b is a graph of the value of Im($\in_\theta$)/Re($\in_h$) for different wavelengths.

In FIG. 4a, the MTF of the imaging system is shown as a function of the transverse wavevector $k_x$. FIG. 4b depicts a simulated result of the image of a pair of slits of width d and center-to-center separation 2d.

FIG. 5a is before and FIG. 5b is after photomodification at wavelength of 1.5 µm. Cartoon insets represent the local film morphology.

FIG. 11a depicts electrical dipole moment as a function of wavelength, where the electric field is oriented parallel to the axis of the rods. FIG. 11b depicts magnetic dipole moment as a function of wavelength, where the magnetic field is oriented perpendicular to the plane of the rods.

DETAILED DESCRIPTION

Figure 2:
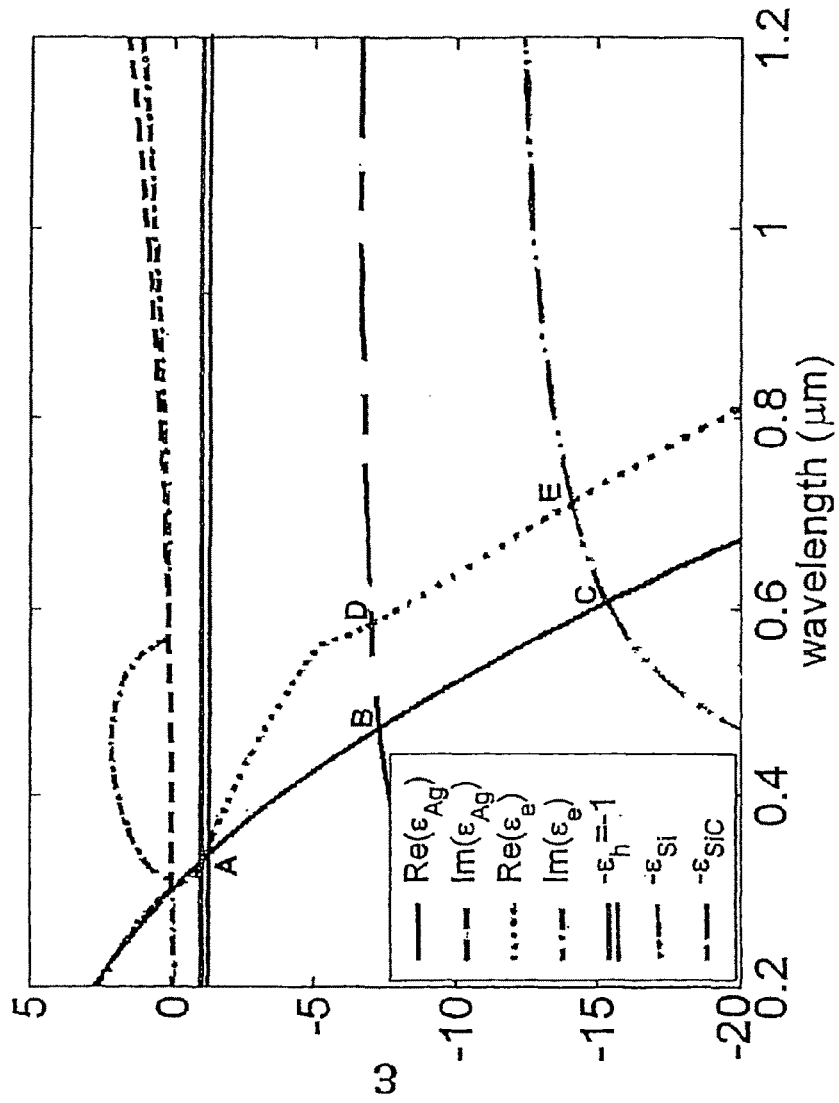
FIG. 2 is a graph of permittivity versus wavelength, illustrating principles of NFSL operation. The composite used is an Ag—$SiO_2$ film with metal filling factor p=0.85. The operational points are: A—silver lens with air host ($\lambda_{op}$=340 nm); B—silver lens with SiC host; C—silver lens with Si host; D—composite lens with SiC host; E—composite lens with Si host.
Figure 1:
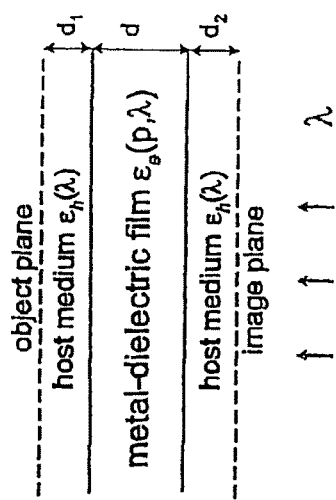
FIG. 1 is a schematic or diagram of a tunable NFSL based on a metal-dielectric composite, in accordance with the present invention.

A schematic or diagram of a frequency-controllable NFSL is shown in FIG. 1. In this work we use the effective medium theory (EMT) to describe the optical properties of the composite material. The EMT model provides an analytical dependence of the effective dielectric permittivity on the light wavelength $\lambda$ and on the metal filling factor p, which is the key to realizing the tunable NFSL. The principle of the tunable NFSL operation using Ag—$SiO_2$ film with a metal filling factor p=0.85 is illustrated in FIG. 2. For a pure silver slab, the operational wavelengths determined by the condition Re[$\in_\theta$(p,$\lambda_{op}$)]=$-\in_h(\lambda_{op})$ are indicated by points A, B, and C for host media of air, SiC and Si, respectively. For the composite NFSL, semiconductor materials like Si and SiC with large $\in_h$ are beneficial to use as the host materials because they can move $\lambda_{op}$ outside the plasmon absorption band and thus avoid significant losses that are associated with large values of $\in_\theta$ and hence detrimental to the achievable resolution. As seen in FIG. 2, using SiC or Si as the host material, a NFSL with a composite Ag—$SiO_2$ film at p=0.85 operates at points D and E, respectively, which are both outside the absorption band of the composite. Thus, for a given host material, one can fabricate a metal-dielectric film with an appropriate filling factor to work for any desired wavelength within a wide wavelength range. Moreover, at the operational point the loss of the lens material can be less than that of pure metal if the resonance peak is avoided. The adverse effect of absorption is less of an issue when semiconductors with high permittivities are used as the host material. This is because such materials provide a better spatial resolution, which is approximately proportional to $1/\ln(|\in'/\in''|)$ for a lens material with permittivity $\in=\in'+i\in''$.

Figures 3A, 3B:
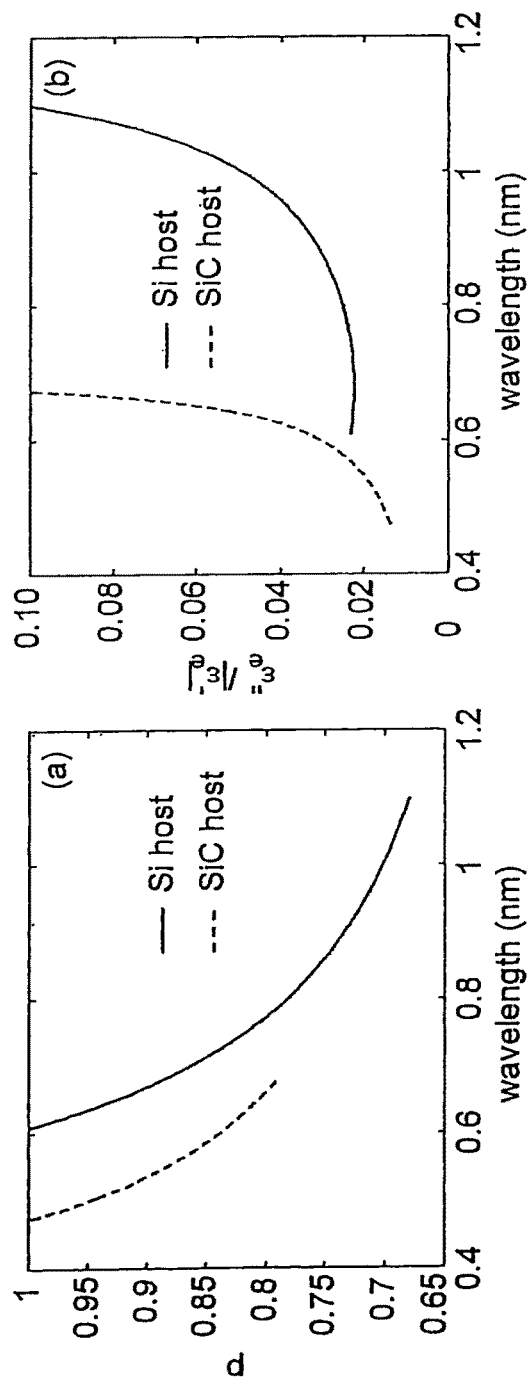
FIGS. 3a and 3b are graphs showing performance of an Ag—$SiO_2$ composite lens with Si or SiC as the host medium.

The performance of an Ag—$SiO_2$ composite lens with Si or SiC as the host medium is illustrated in FIGS. 3a-3b. In FIG. 3a, the required metal filling factor p for superlens operation was found from the superlens equation Re[$\in_\theta(p,\lambda_{op})$]=$-\in_h(\lambda_{op})$ for different wavelengths with Si or SiC as the host medium. For each kind of host material, the lower limit of the operational wavelength range corresponds to the pure metal (p=1) case, where the upper limit of the possible wavelength range is determined by the loss feature of the composite film. As seen in FIG. 3a, with an Ag—$SiO_2$ composite as the lens material, the operation ranges are 0.47-0.67 μm for SiC host material and 0.61-1.10 μm for Si host material. Therefore, combining the results of the two host media we can achieve a possible operational wavelength range of 0.47-1.10 μm, which covers nearly the whole visible spectrum and the shorter part of NIR band. The value of Im($\in_\theta$)/Re($\in_h$) as a function of the operational wavelength is plotted in FIG. 3b.

Figures 4A, 4B:
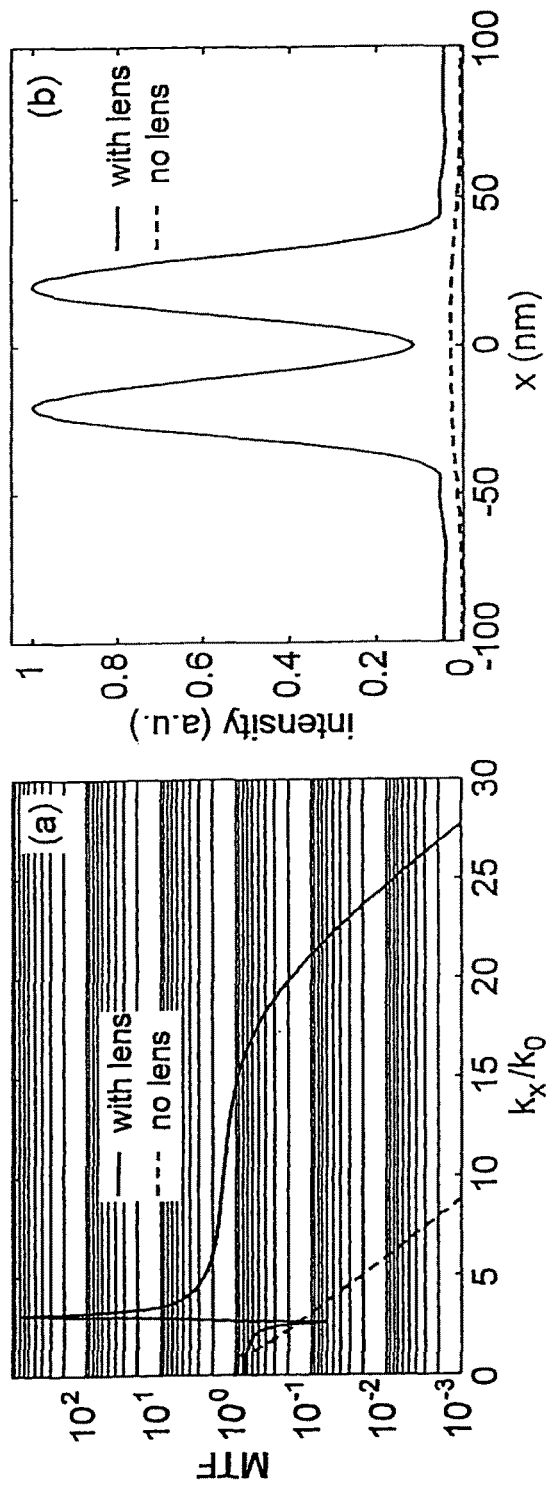
FIGS. 4a and 4b are graphs depicting the imaging ability of a 20 nm Ag—$SiO_2$ composite lens with SiC as the host medium working at 632.8 nm.

As an example of the imaging ability of the proposed composite NFSL, we depict the performance of the Ag—$SiO_2$ NFSL with SiC as the host operating at 632.8 nm in FIGS. 4a-4b. The thickness of the lens is chosen to be d=20 nm. The modulation transfer function (MTF) of the system is used to evaluate the imaging ability of a NFSL. The resolution can be roughly estimated as $\pi/k_{x,max}$, where $k_{x,max}$ is the maximum value of the transverse wavevector $k_x$ where MTF($k_x$) is comparable to unity. FIG. 4a indicated that a resolution of about $\pi/15_0=\lambda/30$ can be obtained. FIG. 4b illustrates the simulated result of the image of a pair of slits of width d and center-to-center separation 2d. The capability of the composite lens in constructing the object at the image plane is obvious.

The analysis above shows that with a high-permittivity host material, the composite lens can be engineered with a suitable metal filling factor to operate at practically any desired wavelength. This spectral tunability is the major advantage of the proposed composite NFSL over the slab lens based on bulk metals.

Figures 5A, 5B:
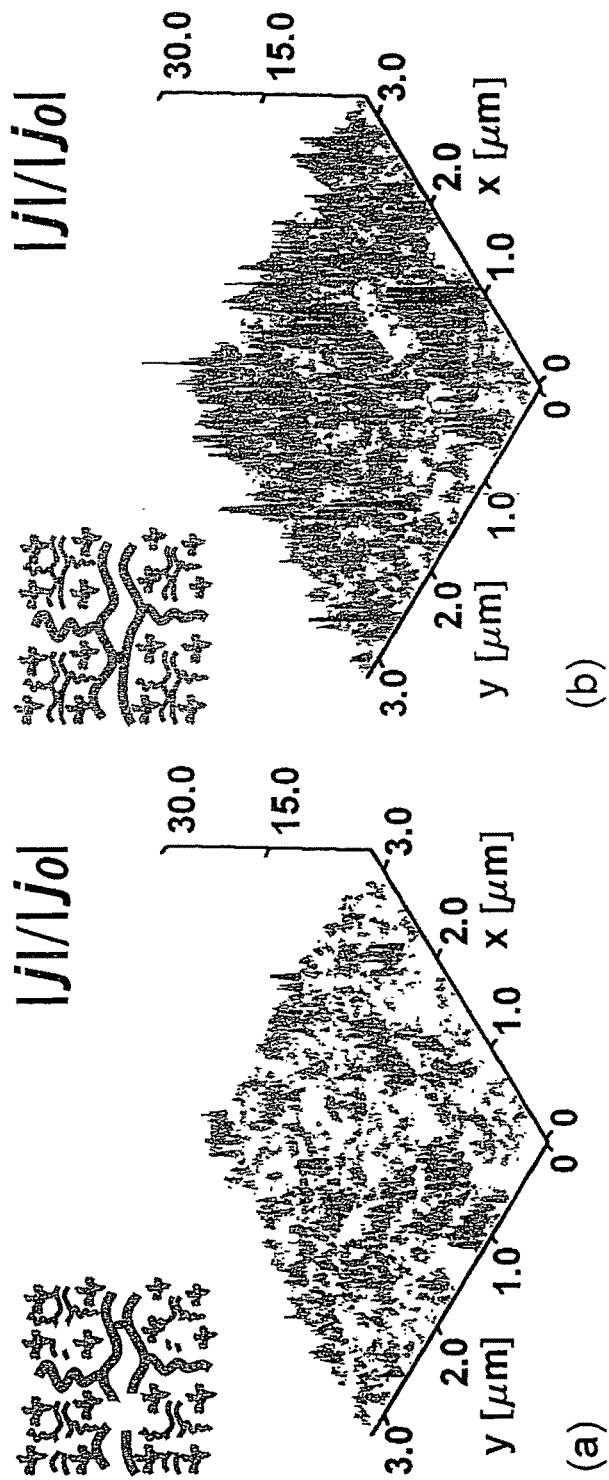
FIGS. 5a and 5b are graphs showing local current enhancement in percolating metal-dielectric film.

The optical properties of metal-dielectric films are closely related to the fine geometry of the metal dusters in the films. During the deposition process, small and isolated metal islands are formed first; as the metal coverage increases, the islands coalesce, forming irregularly shaped clusters of fractal geometry on the substrate. The cluster size increases as the film grows and diverges as the film approaches the percolation threshold, where an "infinite" percolation duster of metal is formed and an insulator-to-metal transition occurs. Percolation films are formed by clusters of all sizes, from the size of individual particles to the "infinite" fractal cluster that spans over the whole film, and therefore capable of supporting the plasmonic modes for all the wavelengths. This can be understood qualitatively based on very simple arguments described below. In the vicinity of the percolation threshold, the system is scale-invariant and can be thought of as a fractal set of metal clusters of all sizes as illustrated in the inset of FIG. 5a. The metal clusters can be represented as inductive elements, with the inductance proportional to their size, L~l; the dielectric gaps, in turn, represent capacitive elements, with the capacitance C~l. The frequency at which such effective LC circuits resonate is given by $\omega_r \sim 1/l(\sqrt{LC}) \propto l^{-1}$ so that at higher frequencies, smaller clusters resonate and at lower frequencies, larger clusters become resonant. Thus, metal-dielectric films can be thought of as a collection of resonant optical LC circuits with the resonance frequencies covering the whole spectrum.

Figure 6:
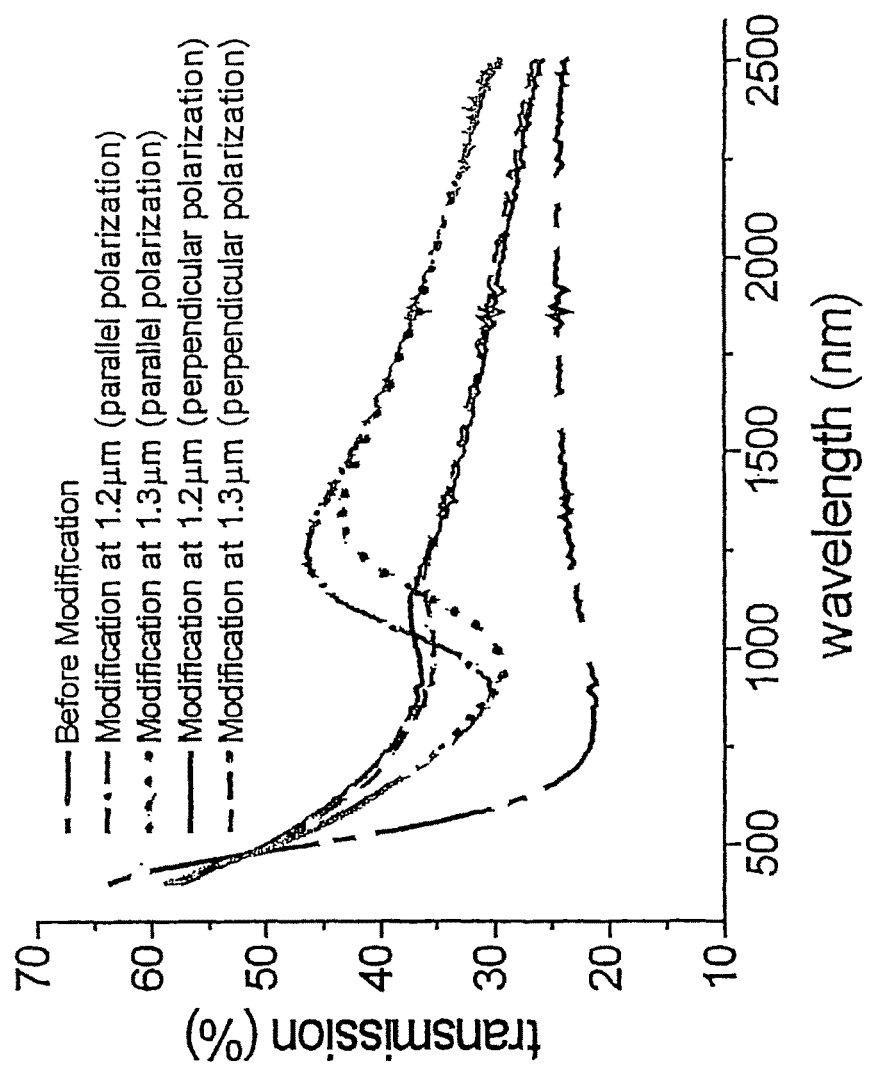
FIG. 6 is a graph illustrating the increase in transmission of semicontinuous film after the wavelength-selective photomodification at 1.2 µm and 1.3 µm.

The principle of photomodification is that, by illuminating the semicontinuous film with a high intensity laser beam, the clusters that resonate at the incident wavelength are destroyed and a transparent window in the transmittance spectrum can be created. During this process, the local topology change in the film is minimal, while the plasmonic resonance around the illuminating frequency is suppressed and the optical properties of the film are dramatically altered in a pre-set spectral range. An illustration of this effect is shown in FIG. 5, where the local current enhancement in the film before and after photomodification at 1.5 μm is presented. The preliminary experimental results showing the results of the photomodification are plotted in FIG. 6.

Figure 7:
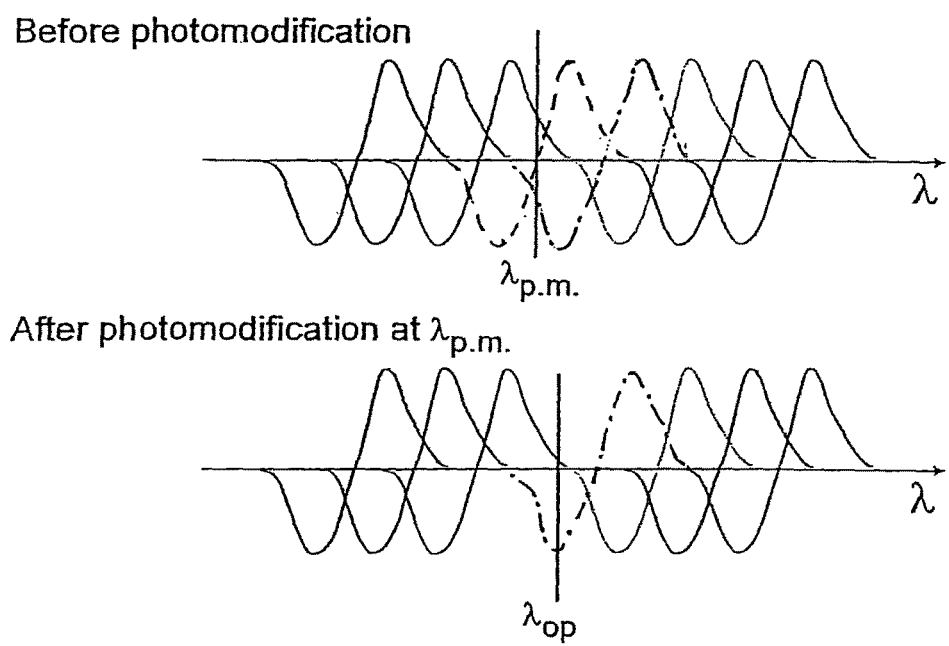
FIG. 7 is a schematic of using spectral-selective photomodification to create the negative electromagnetic response. The resonance corresponding to $\lambda_{p.m.}$ (dashed line) is removed; and the system experiences a net negative effect at wavelengths slightly longer than as indicated by $\lambda_{op}$ (dot-dash line).

The spectral-selective photomodification provides a way of creating wavelength-controllable NIMs. FIG. 7 is a schematic showing the idea. As described in the previous paragraph, metal-dielectric films at percolation threshold support the plasmonic resonance for virtually any wavelengths. At any wavelength $\lambda$, the resonance has a finite bandwidth, giving a negative response for the wavelengths slightly shorter than $\lambda$, and a positive response for the wavelengths slightly longer. After the photomodification process with a burning wavelength of $\lambda_{p.m.}$, the clusters resonating at $\lambda_{p.m.}$ are destroyed and the resonance corresponding to $\lambda_{p.m.}$ is removed. As a result, the system experiences a "net" negative response at the wavelength slightly longer than $\lambda_{p.m.}$ (indicated by $\lambda_{op}$ in FIG. 7).

The frequency at which the magnetic response and negative refraction can occur in the composite film can be controlled by varying the wavelength of photomodification.

Hence, the proposed approach provides an efficient means of producing negative electromagnetic response at any desired wavelength.

In accordance with the considerations above, random metal-dielectric composite films have the potential of developing versatile and wavelength-controllable NFSL and NIMs. They are of crucial importance and vital essential in a wide range of applications including bio-sensing, spectroscopy, sub-wavelength imaging, and nanolithography.

The detection and identification of chemical and biological agents, bio-medical detection of disease, and non-invasive assessment of health are among today's most demanding techniques. The combination of composite lenses and surface-enhanced spectroscopy can make a difference in the whole field of bio- and chemical-sensing.

The first application of the proposed composite lens is surface-enhanced, remote sensing of bio-molecules such as proteins, using, for example, surface-enhanced Raman scattering (SERS). In this approach, one images the substrate, which provides enhancement for the Raman signal, to a different place in space where analyte bio-molecules are located such that the molecules are physically separated from the substrate. It is known that in SERS the molecules on the metal surface typically experience undesired modifications due to at least the charge transfer effect, causing significant changes in their optical spectra and biological activity. As a result, the optical spectra often represent signatures of metal-molecule complexes rather than molecules themselves. On top of that, the deposition of proteins on a metal surface can denature the molecules or cause other significant changes so that antibodies, for example, can loose their binding activity. Therefore, the possibility to translate the enhancement provided by a metal surface to areas outside of the metal can make a difference for the surface-enhanced molecule sensing such as SERS sensing.

Figure 8:
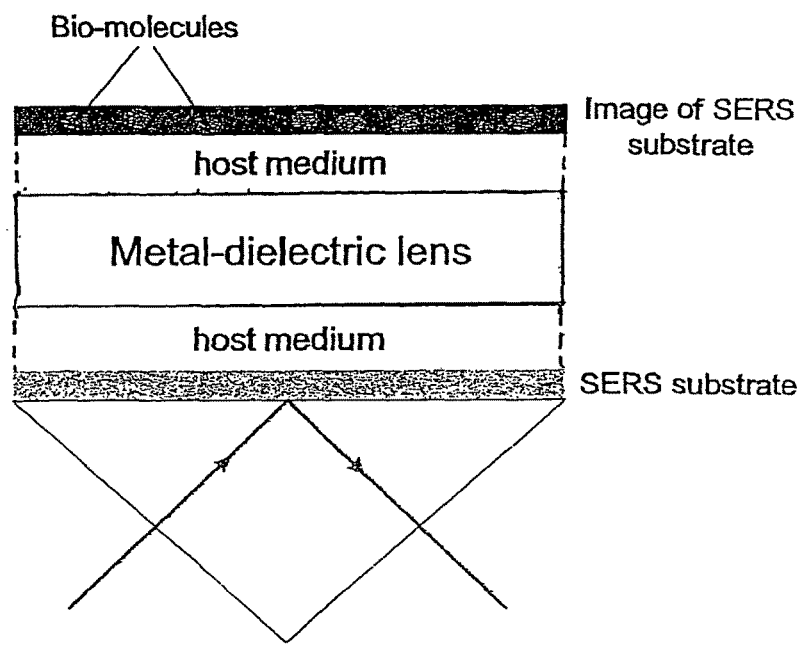
FIG. 8 is a schematic or diagram of a tunable NFSL for remote SERS sensing by imaging an enhanced field in a SERS substrate to a layer containing bio-molecules.

A metal-dielectric composite lens offers a solution to the problem by "imaging" the high local fields of the SERS substrate to the other side of the composite lens, where biomolecules are placed, as illustrated in FIG. 8. In this case, molecules are away from the metal and thus do not undergo any modification caused by the metal, but they still experience the dramatic enhancement provided by the metal surface. This approach enables one to observe SERS spectra of intact molecules rather than molecule-metal complexes.

Figure 9:
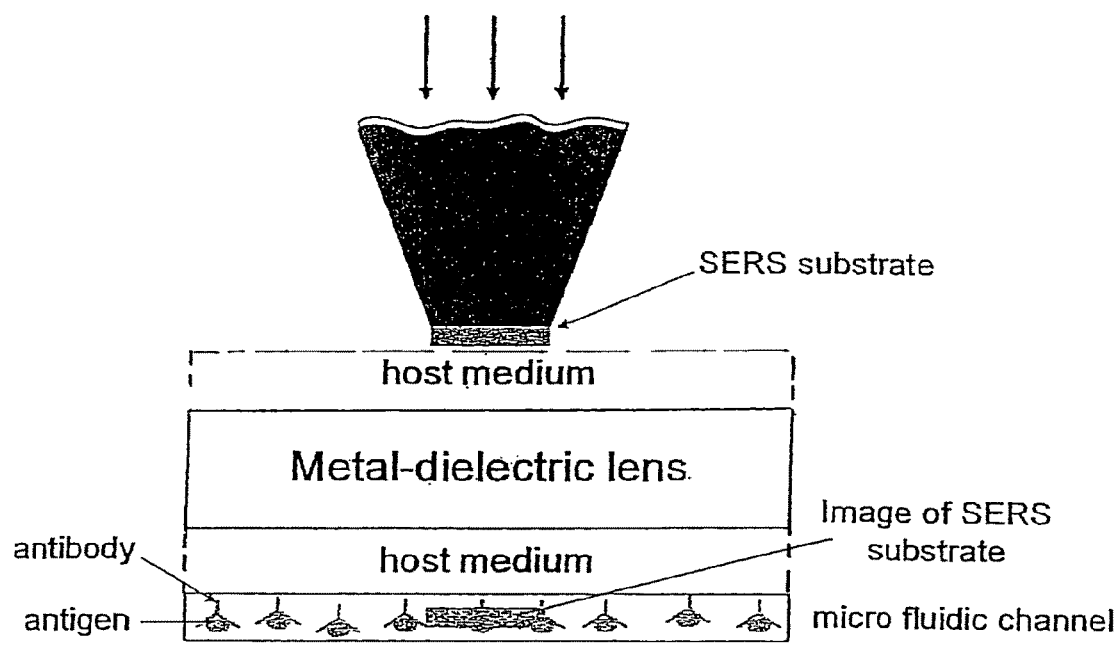
FIG. 9 is a schematic or diagram of the tunable NFSL of FIG. 8, being used in the SERS sensing of antibody, antigen and their binding.

As a related technique, the composite lens can be employed to obtain SERS spectra of antibody and antigen and to detect the modification in the spectra caused by the binding event, as illustrated in FIG. 9. This can be done by "focusing" the image of the SERS substrate, which provides the field enhancement to the layers of antibodies and antigens. Such precise "focusing" may be accomplished by coating an NSOM tip with a SERS substrate. The tip-surface separation is controlled by feedback provided by the shear force in the NSOM system so that the tip can be positioned with very high, nanometer-scale precision. Thus by moving the position of the SERS substrate (NSOM tip) with respect to the composite lens, we can focus its image to the layers of antibodies and antigens and detect modification in spectra caused by the binding event. Proteins will be delivered to the image plane by microfluidic channels, similar to those used in the standard surface plasmon sensors.

Figure 10:
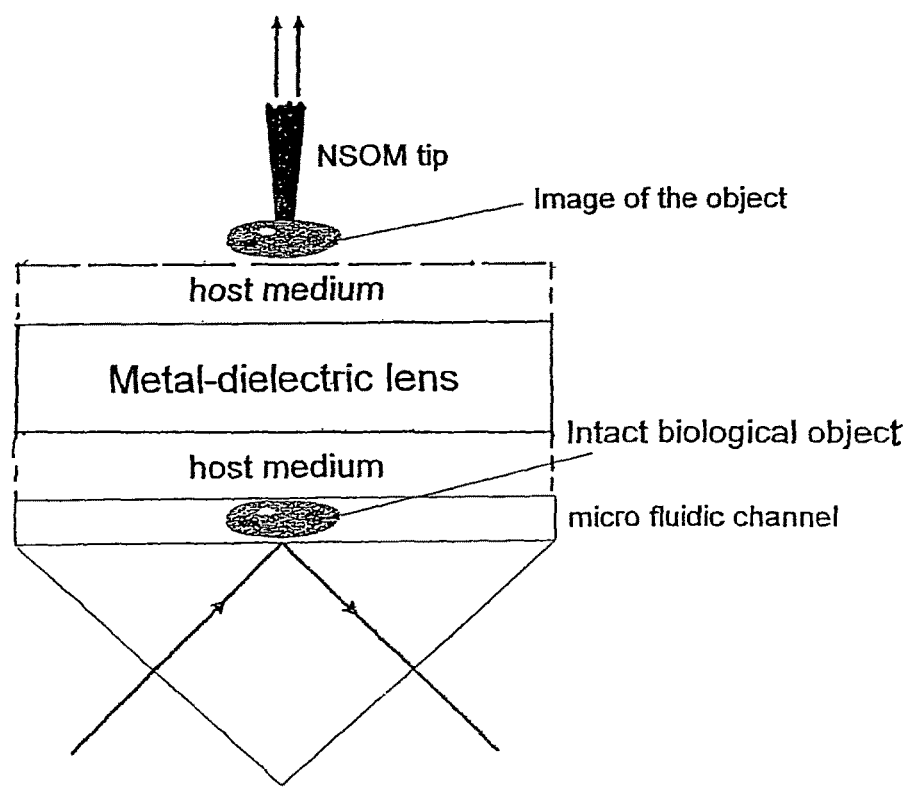
FIG. 10 is a schematic or diagram of a NFSL in accordance with the present invention, being used to probe the internal structures in intact biological objects.

For various biomedical and detection applications, it is of critical importance to obtain sub-wavelength resolution for optical probing of the internal structure of intact cells, spores, and other biological objects. Near-field scanning optical microscopy (NSOM) employs a tiny fiber tip and allows sub-wavelength resolution imaging. However, to make such NSOM probing possible, the tip would need to penetrate inside the object, often modifying or even destroying the object. The monitoring of locations of various internal structures in the intact cells and other objects can be done with a metal-dielectric lens, which allows one to image a bio-object to the other side of the lens and then scan the objects image with an NSOM tip without touching the object itself. The schematic for the technique is depicted in FIG. 10. This remote, non-invasive intra-object imaging is of particular interest for biomedical analysis and sensing of biological agents.

Figure 11:
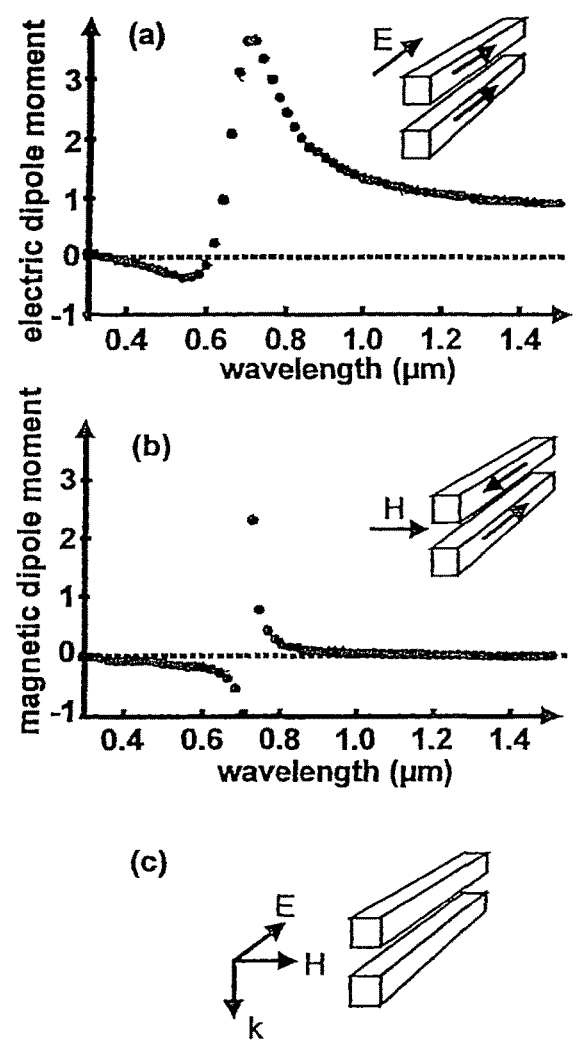
FIGS. 11a and 11b are graphs showing the response to radiation of a pair of gold nanorods depicted schematically in FIG. 11c, simulated with coupled dipole approximation technique.
FIG. 11c depicts the pair of rods illuminated from above with TM polarisation. The pair of rods will have a double negative response to the field.

It was mentioned by Lagarkov and Sarychev [29] that a pair of noble metal nanorods can show a large paramagnetic response, and it was first pointed out by Podolskiy et al. [30] that such a pair of noble metal nanorods is also capable of a diamagnetic response at 1500 nm. In this publication [30], it was predicted for the first time, that materials containing such pairs of rods can show a negative n' even for visible wavelengths. The issue has been discussed in more detail by Panina et al. [26] and also Podolskiy et al. [31, 32]. It is illustrated in FIGS. 11a-11c how a pair of nanorods can show a negative response to an electromagnetic plane wave. Two gold rods are separated by a distance far less than the wavelength. The diameter of the cross section of the rods is also much less than the wavelength and the length of the rods may be, but does not need to be in the range of half of the wavelength. An AC electric field parallel to both rods will induce parallel currents in both rods which are in phase or out of phase with the original electric field, depending on whether the wavelength of the electric field is longer or shorter than the wavelength of the dipolar eigen-resonance of the electrodynamically coupled rods. FIG. 11a shows the induced electric dipole moment in case of the following specific dimensions as it has been reported by Podolskiy et al. [32]: a rod length of 162 nm, a diameter of 32 nm (assuming cylindrically shaped rods), and a distance of 80 nm.

Consider the magnetic field which shall be oriented perpendicular to the plane of the rods. This magnetic field will cause anti-parallel currents in the two rods as shown in FIG. 11b. This can be considered as a dipolar magnetic mode. The magnetic response will be dia- or paramagnetic depending on whether the wavelength of the incoming magnetic field is shorter or longer than the dipolar magnetic eigenfrequency of the electrodynamically coupled rods (FIG. 11b, after [32]). In this description in terms of coupled plasmonic resonances the magnetic dipole resonance appears at the same wavelength as the electric quadrupole resonance. However, the latter does not contribute to the electromagnetic radiation in the direction given in FIG. 11c.

So far, the electromagnetic response has been discussed in terms of coupled plasmonic resonances. An alternative way of looking at it is that the anti-parallel currents in the rods and the displacement currents at the ends of the two rods form a current loop or an inductance, while the gaps at the ends form two capacitors. The result is a resonant LC-circuit [29, 33].

It is important that both resonances, the dipolar electric and the dipolar magnetic resonance are at similar wavelengths. This requires that the coupling between the two rods should not be too strong, because otherwise the two resonances split further apart. It is seen in FIGS. 11a and b that there is a certain range of wavelengths (between 500 and 600 nm) where both, the induced electric and the induced magnetic dipole moments are opposing the incident fields. Hence, an electromagnetic plane wave impinging from above and with E and H oriented as shown in FIG. 11c (TM polarization) will induce a double negative response.

To the best of our knowledge, the unambiguous measurement of a negative refractive index in the optical range (specifically, at the optical telecom wavelength of 1500 nm) was reported for the first time Shalaev et al. [34, 35]. The metamaterial in which the negative refractive index was achieved is outlined in FIGS. 12a-12b. Pairs of nanorods were fabricated on a glass substrate using electron beam lithography. The actual structure of the gold nanorod doublets is shown in FIG. 12a. The nanorods are 50 nm thick, stacked on top of the glass substrate, and a 50 nm thick SiO$_2$ layer is used as a spacer. The upper rod is smaller in dimensions than the lower rod. A TEM micrograph of a single pair and its dimensions is shown in FIG. 12a. Pairs of nanorods are periodically repeated as depicted in FIG. 12b and shown by a TEM micrograph in FIG. 12c. FIG. 12d shows the unit cell of the periodic arrangement and gives more dimensions. A full description of the sample and its preparation, has been given [35, 37, 38]. A similar sample containing pairs of gold nanoparticles show transmission spectra that can be explained if a negative permeability is assumed [36]. However, a negative refractive index has not been observed in that work.

Figure 12:
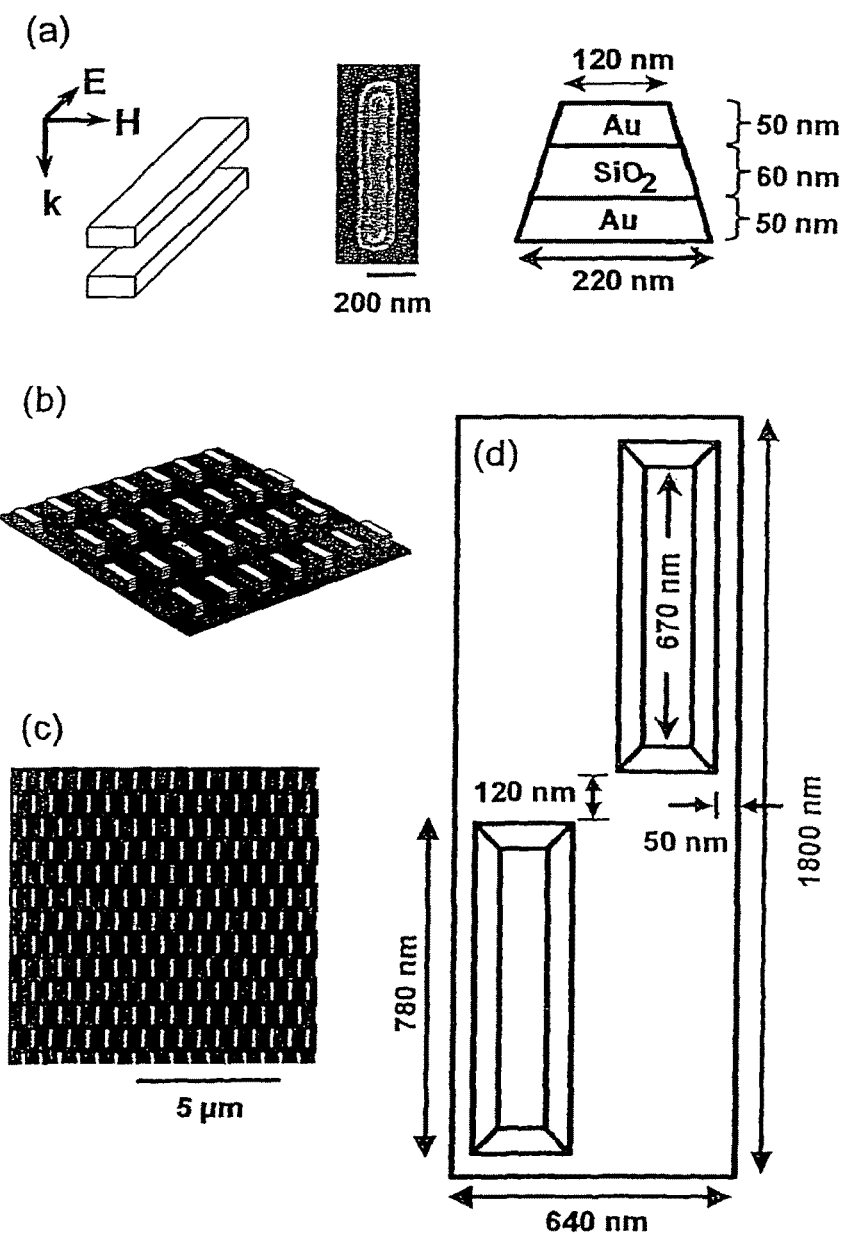
FIG. 12a includes a schematic isometric view of a nanorod pair and proper light polarization for negative index, SEM image, dimensions.
FIG. 12b is a schematic isometric view of an arrangement of nanorod pairs.
FIG. 12c is an SEM image of arranged nanorod pairs.
FIG. 12(d) is a diagram showing one unit cell and the dimensions of the arrangement of FIG. 1c.
Figure 13:
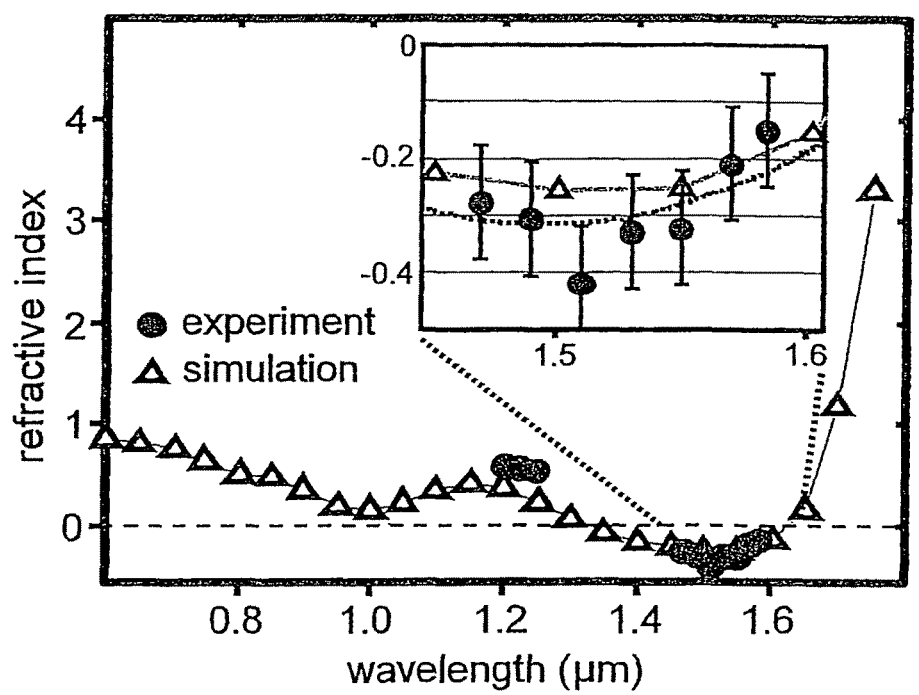
FIG. 13 is a graph, as a function of wavelength, of the real part of the refractive index of a layer of nanorod pairs as shown in FIG. 12. Full circles represent data that are restored from experimentally determined transmission, reflection, and phase measurements. Open triangles represent FDTD simulation. An inset shows a zoom or enlarged view of the region of negative refraction. The dashed line is a least square fit to the experimental data. A refractive index of n'=−0.3±0.1 was determined.

FIG. 13 shows the results obtained by Shalaev et al. [35] for the real part of the refractive index of the metamaterial shown in FIG. 12. The full circles show experimental results and the open triangles give the results as obtained from simulations using the finite difference method in time domain (FDTD). It is clearly seen that the real part of the refractive index becomes negative in the wavelength range from approximately 1400 nm to 1600 nm, which includes the important telecommunication band at 1500 nm. The inset gives a closer look to that frequency range. The experimental data prove that n'=−0.3±0.1 was obtained [35].

It turns out to be not trivial to experimentally determine the exact value of the refractive index for a thin film. In the present case, the film of negative refraction was only 160 nm thick. Therefore, the straightforward method of determining n by applying Snell's law to the incoming and refracted beams can not be used. A different method to unambiguously determine the refractive index requires the measurement of the transmission T, the reflectance R and the absolute phases of the transmitted and reflected electric fields $\tau$ and $\rho$, respectively. If those four quantities are measured, the refractive index n=n'+in" in a thin, passive (n">0) film sandwiched between air (top) and a glass substrate (bottom) can be determined uniquely as it has been discussed by Kildishev et al. and Smith et al. [38, 39] using transfer matrices:

$$n = \frac{1}{k\Delta}\arccos\frac{1-r^2+n_s t^2}{[1+n_s-(1-n_s)r]t}, \quad (2)$$

where $k=2\pi/\lambda$ is the wave vector of light, $\Delta$ is the thickness of the thin film, $n_0$ is the refractive index of the glass substrate, and r and t are the complex reflection and transmission coefficients:

$$t=\sqrt{T}e^{i\tau}, \quad r=\sqrt{R}e^{i\rho}. \quad (3)$$

Figure 14:
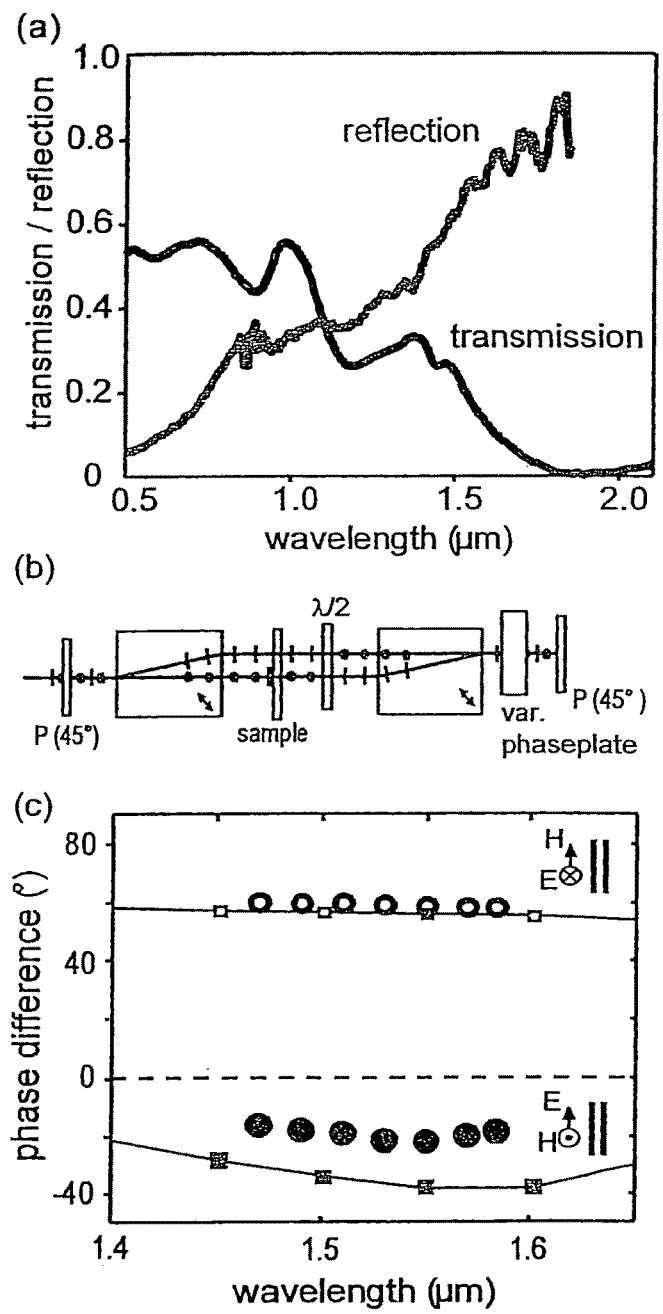
FIG. 14a is a graph of measured transmission and reflection spectra of the sample shown in FIG. 3.
FIG. 14b is a diagram of the setup for phase measurements.
FIG. 14c is a graph of phase difference as a function of wavelength in two light paths as shown in FIG. 14b. Circles are measured values, while quadrangles and lines are from simulation. The light is delayed in case of TE polarisation (H-field parallel to rod pair, open symbols). In contrast, the phase is advanced in case of TM polarisation.

FIG. 14a shows the transmission and reflection spectra of the negative index metamaterial of FIGS. 12a-12c. In order to measure the absolute phase, the beam of a tunable semiconductor laser was split in two orthogonally polarized beams, where one beam passed through the negative index metamaterial of thickness $\Delta$ while the other beam was used as a reference and passed only through the glass substrate at a spot not covered by the metamaterial [37], (FIG. 14b). The beams were recombined behind the glass substrate. The phase difference between the beam passing through the thin film and the reference beam propagating only through air of the same thickness $\Delta$ was determined using interferometry (FIG. 14c). The phase $\tau$ was delayed in the metamaterial by approx. 60° compared to air in case of TE polarization (electric field perpendicular to the plane of rods). In contrast, $\tau$ was advanced by approx. 20° in case of TM polarization (FIG. 14c, Ref. [35]). The phase shifts in reflection $\rho$ were obtained for both polarizations in a similar way. The advancement of $\tau$ for TM polarization was an indirect evidence of n'<1. However, to unambiguously prove that n'<0, the complete set (T, R, $\tau$, $\rho$) must be obtained, so that n can be reconstructed using Eq. 3 [38].

Nevertheless, one can use pure phase measurements to make an estimate for n' as it has been pointed out by Kildishev et al. [38]. In the case of low reflection (R<<1), the following equation holds:

$$n' \approx \frac{\tau}{k\Delta}, \quad (4)$$

while in the limit of strong reflection (R≈1) the following equation holds:

$$n' \approx \frac{\tau-\rho-\pi/2}{k\Delta}. \quad (5)$$

Figure 15:
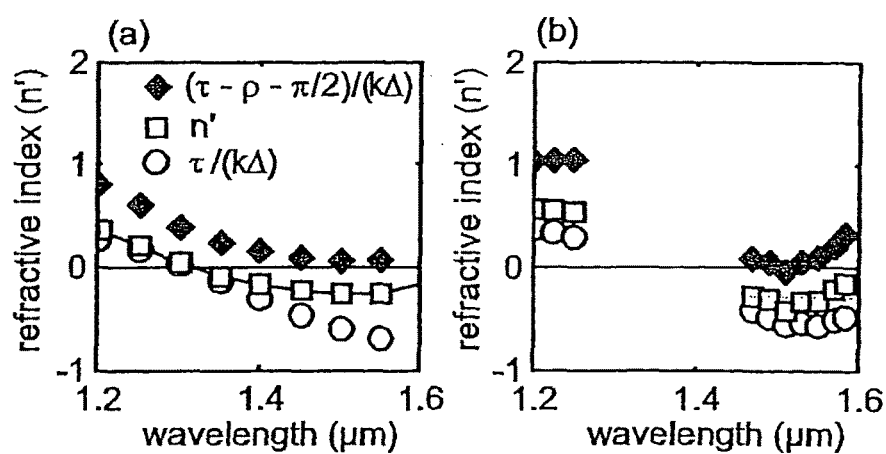
FIG. 15a is a numerical simulations graph, as a function of wavelength, of the real part of the refractive index as determined by the exact formula (Eq. 2) (squares) or by phase only assumptions according to Eq. 5 (full diamonds) or Eq. 4 (open circles).
FIG. 15b shows experimental results.

These two formulas indeed give an upper and lower bound to the correct value of n' according to equations (2) and (3) (see FIGS. 15a-15b) [38].

Figure 16:
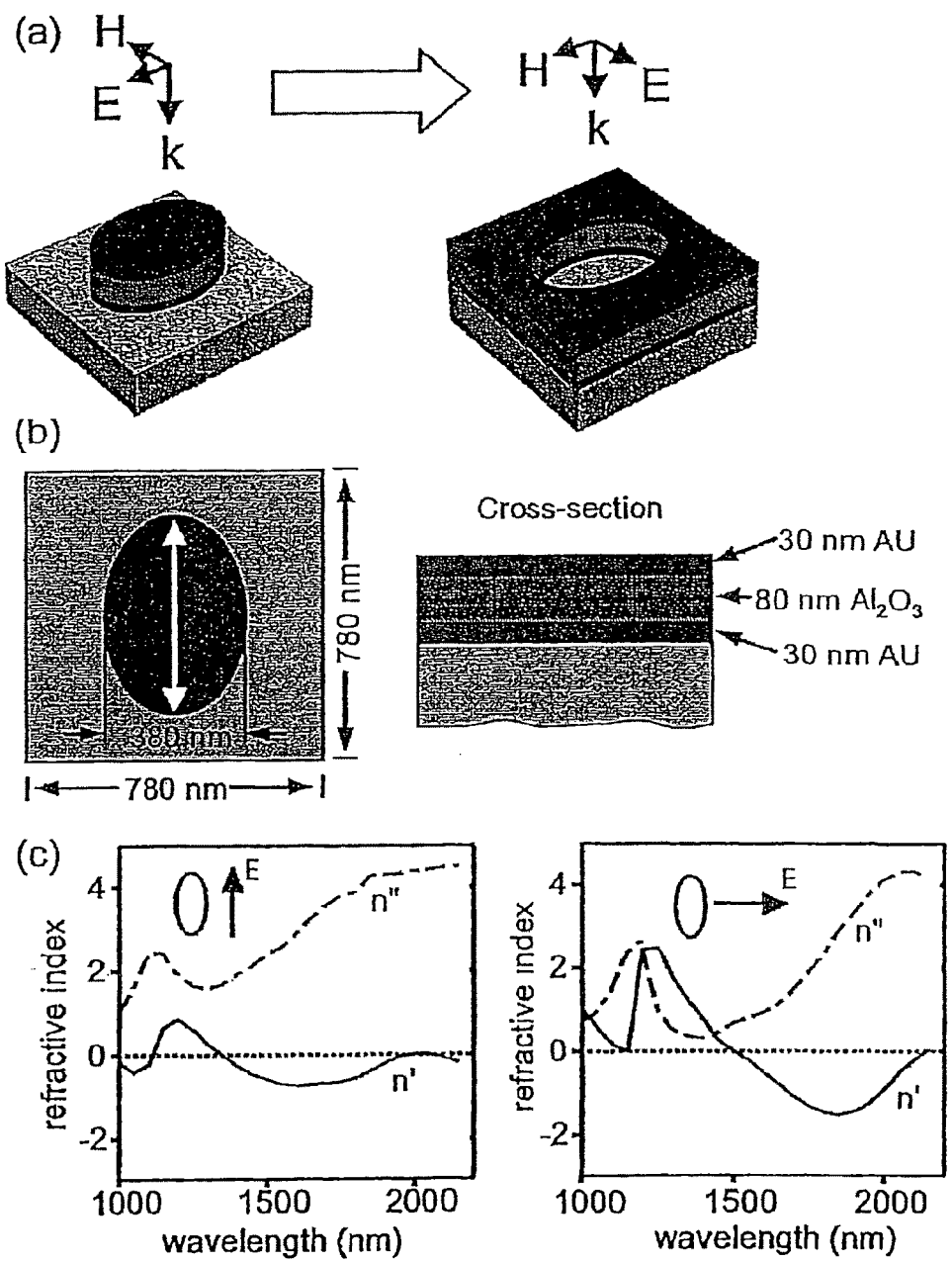
FIG. 16a is a pair of diagrams, the left diagram showing a nano-ellipse consisting of two 30 nm thick ellipses of gold separated by 80 nm of $Al_2O_3$, the right diagram showing an elementary cell of coupled elliptic voids.
FIG. 16b is a diagram illustrating the dimensions of the voids in FIG. 16a. The voids are repeated periodically in 2D.
FIG. 16c is a pair of graphs, the left graph showing refractive index n=n'+in" as a function of wavelength for light polarized parallel, the right graph showing refractive index as a function of wavelength for light polarized perpendicular to the long axis of the voids as obtained from FDTD simulations.

It is an interesting approach to negative index metamaterials to take the inverse of a resonant structure [40], e.g. a pair of voids as the inverse of a pair of nanorods [41-43]. The basic idea is illustrated in FIG. 16a. Instead of a pair of metal nano-ellipses separated by an oxide, which are similar to the pair of rods in FIG. 11, two thin films of metal are separated by an oxide and mounted on a glass substrate. Then, an elliptically shaped void is etched in the films (FIG. 16a, right hand side), thus forming the negative of the original paired metal ellipse structure (FIG. 16a, left hand side). Both samples should have similar resonance behavior if the orientation of the electric and magnetic fields are also interchanged. FDTD simulations have been performed to determine the refractive index of void metamaterials [38]. The dimensions were chosen according to FIG. 16b in the simulations in order to match the dimensions of the experimental sample reported by Zhang et al. [43].

The simulations were carried out for both cases of polarizations: the electric field oriented along the long axis of the elliptical voids and perpendicular to it. It is seen that n' becomes negative in both cases, however, the effect is more pronounced if the electric field is oriented along the short axis (FIG. 16c). Further more, at approximately 1600 nm the real part of n is negative while the imaginary part is less than 1 indicating lower losses compared to the double rod sample discussed before, where the imaginary part of the refractive index was 3 [35]. Experimental measurements with samples similar to those sketched in FIG. 16a, but with spherical voids instead of elliptical voids, confirmed a negative n' at a wavelength of 2 μm [41]. The imaginary part n" was large in that case, however it has been shown that further optimization can reduce n" substantially [43].

Metamaterials using plasmon resonant metal nanoparticles have two distinct problems, each of them reducing the overall transmission through the metamaterial: The first one is absorptive losses (in terms of a large n″), because ohmic losses are generally large due to the excitation of localized plasmon resonances in the nanostructures. A possible solution to this problem will be discussed in the next section. In this section we will concentrate on the second issue, which is impedance matching. The impedance is given by $Z^2=(Z'+iZ'')^2=\mu\epsilon^{-1}$ and it is required that the impedances match at a boundary between two media in order to eliminate reflection. This condition is well known for microwaves and replaces Brewster's law for optical frequencies if $\mu \neq 1$ [26]. Impedance is matched at a boundary between a negative index metamaterial and air, if $Z'\rightarrow 1$ and $Z''\rightarrow 0$ in the metamaterial.

Figure 17:
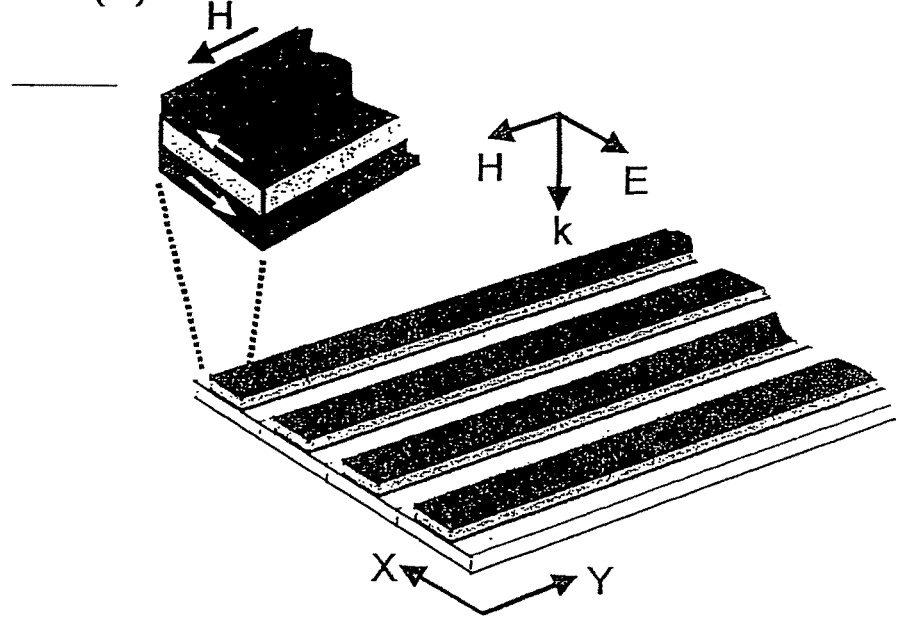
FIG. 17a is a schematic isometric view with an enlarged inset, showing double silver strips, separated by $Al_2O_3$. The strips are infinitely long in y-direction and periodically repeated in x-direction. The H field is oriented in y-direction. Currents in the both strips are anti-parallel (white arrows in the magnified inset) if the H-field is polarized in y-direction.
FIG. 17b is a graph of the real parts of permittivity and permeability as functions of wavelength, as simulated with FEMFD.
Figure 17:
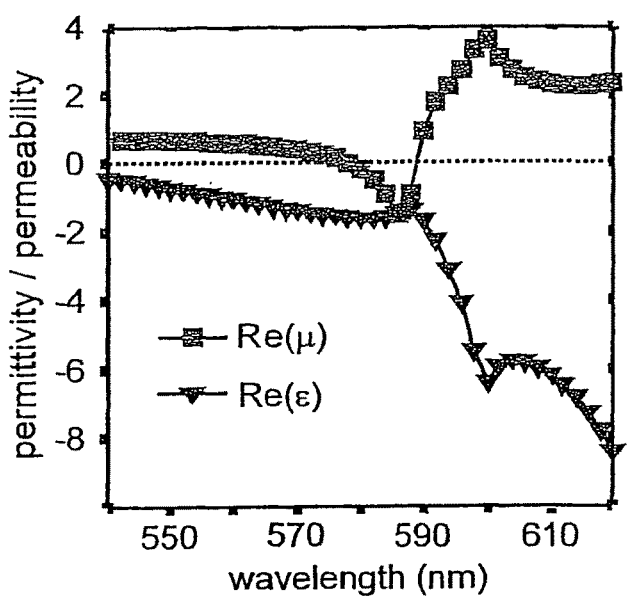
Figure 18:
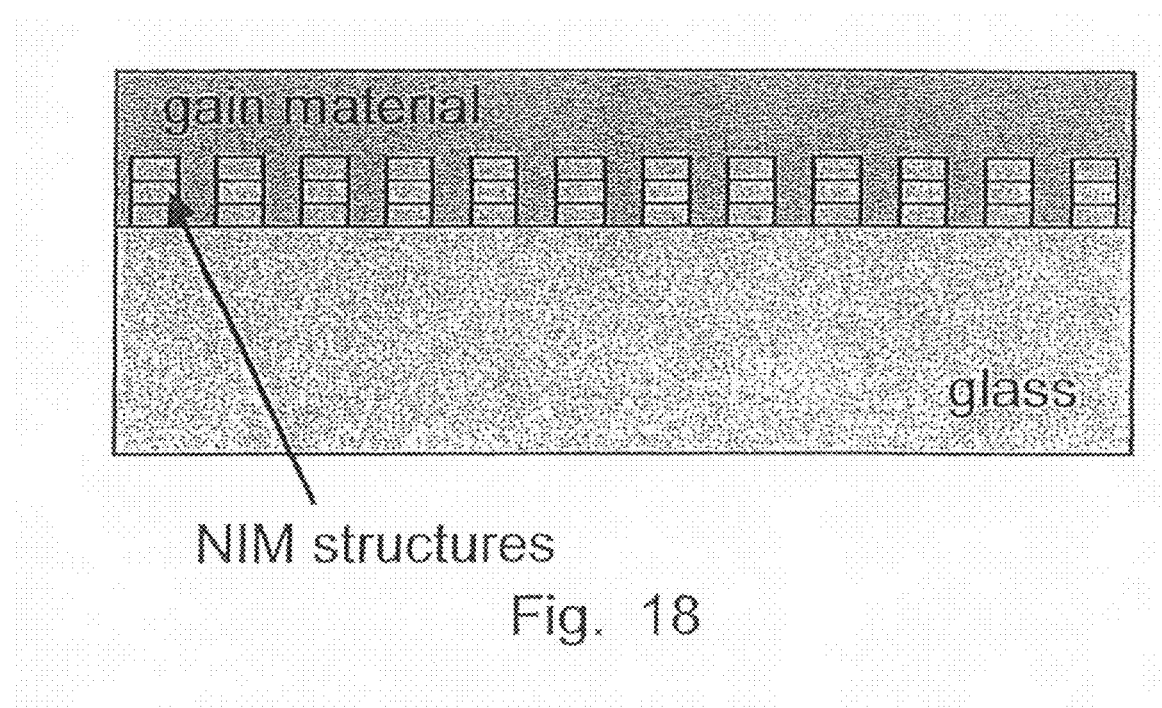
FIG. 18 is a schematic cross-sectional view of a negative index material (e.g. double rods), filled with gain medium, e.g. a solid solution of dye molecules in a matrix.

In FIG. 17a we introduce a metamaterial where the conditions $Z\rightarrow 1+i0$, $n'<-1$, and $n''<1$ hold simultaneously for a visible wavelength. The structure consists of pairs of coupled silver strips. Both strips are 280 nm wide (x-direction), 16 nm thick and they are infinitely long in the y-direction. The two silver strips are separated in z-direction by a 65 nm thick layer of $Al_2O_3$. The pairs of strips are periodically repeated in x-direction with a period of 500 nm. We assume air above and below the layer of strips. In our finite element frequency domain (FEMFD) simulations this layer of metamaterial is illuminated from above with plane waves at normal incidence (along z-direction). The electric field is polarized in x-direction. The magnetic field, which is parallel to the strips, induces anti-parallel currents in the two silver strips as indicated in the magnified inset of FIG. 17a by the two white arrows. This leads to a magnetic response of the structure. We use FEMFD calculations to determine the spectra of the electrodynamic constants. FIG. 17b shows the real parts of the permittivity (triangles) and of the permeability (squares). It is seen that both are negative at wavelengths between 580 and 590 nm.

The spectra of the reflectance, transmission, absorption, refractive index, and impedance were determined. The transmission has a local maximum of 51% at 582 nm. This is because the reflection has a local minimum and the absorption is limited. Indeed, the impedance is matched quite well from 582 to 589 nm, i.e. $Z'>0.5$ and eventually reaching 1 at 586 nm, and simultaneously $|Z''|<0.5$ in the range 570-585 nm. In total, this leads to a reflectance of less than 10% at 584 nm.

The absorption has a local maximum at 586 nm, however it does not reproduce the spectrum of n″. This is mainly because the reflection at the interface between air and the metamaterial hinders the electromagnetic radiation from entering the metamaterial at longer wavelengths and therefore the effective absorption of radiation inside the metamaterial is low for longer wavelengths. Still, it accounts for almost 90% of the losses in the range of the "reflectance window" at 584 nm. In summary of this section, we have shown that a metamaterial consisting of pairs of silver strips as depicted in FIG. 17a can form an almost impedance matched negative index material for visible light. The transmission is limited to 50% almost solely due to absorption, while reflection losses play a minor role.

It has been pointed out recently, that energy can be transferred from gain material to surface plasmon polaritons [44-48] or to plasmons in metal nanostructures [49, 50] using stimulated emission. Specifically, continuous thin films of metal have been used to confine lasing modes in quantum cascade lasers to the gain region and also to guide the lasing modes by surface plasmon modes [44]. Ramakrishna and Pendry suggested to staple gain materials such as semiconductor laser materials in between the negative index (or metal) layers of stacked near-field lenses [51] in order to remove absorption and improve resolution. The requirement of a perfect near-field lens, where thin layers of positive and negative index materials are alternated is, that $\epsilon_P=-\epsilon_N$ and simultaneously $\mu_P=-\mu_N$ where the subscripts denote materials constants of positive (P) and negative (N) materials. This requirement naturally includes the conditions $\epsilon''_P=-\epsilon''_N$ and $\mu''_P=-\mu''_N$, i.e. the positive layers must provide gain in order to optimize the lens [51].

In our discussion we would like to turn to the refractive index rather than the permittivity and the permeability, because the absorption ($\alpha$) and gain (g) coefficients are more straightforwardly connected to the refractive index:

$$n'' = \frac{\lambda}{4\pi}(\alpha - g).$$

Figure 19:
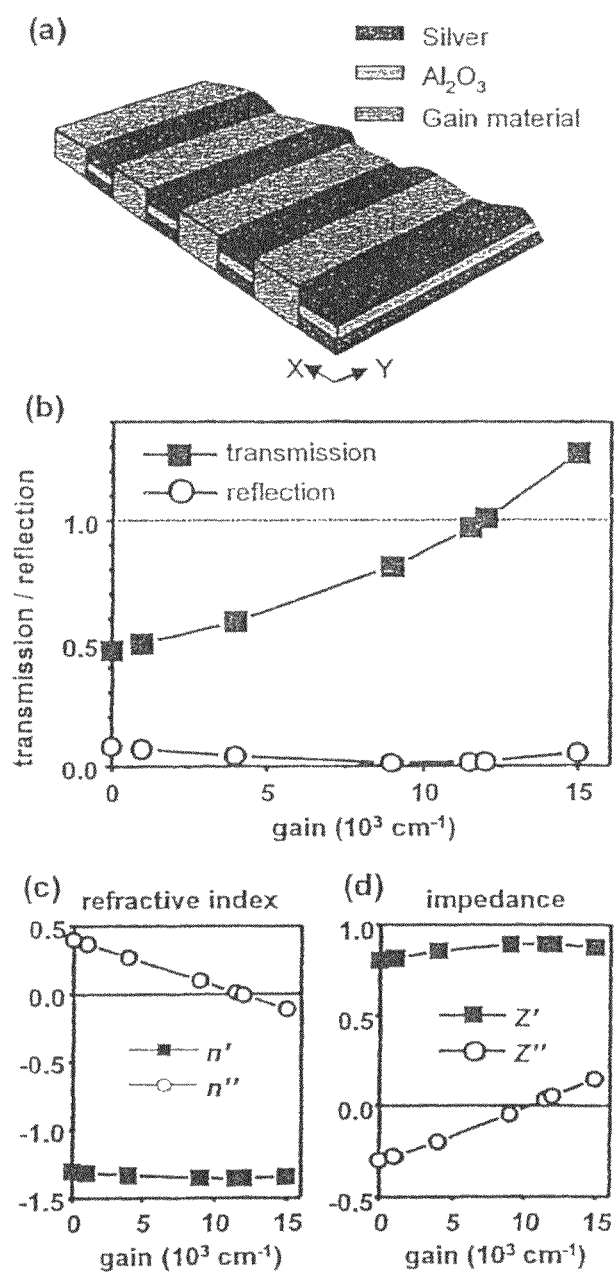
FIG. 19a is a partial schematic perspective view of the same sample as in FIG. 17a, but with gain providing material in between the double silver strips. Air is assumed above and below the layer, and the layer is irradiated with a plain wave (584 nm) from above, H-field polarized along the y-direction.
FIG. 19b is a graph of transmission and reflection as a function of the gain. At g=12 000 1/cm gain and losses cancel each other. The reflection shows also a minimum at g=12 000 1/cm.
FIGS. 19c and 19d are graphs showing refractive index and impedance each respectively as a function of gain. The real part of the refractive index os n'≈1.35 for all investigated gain levels.

Further, instead of alternating negative and positive index materials we propose to "submerge" the negative index structures (containing e.g. metal nanorods) in gain media as shown in FIG. 19a. This could be achieved e.g. by spin coating a solution of laser dye molecules or π-conjugated molecules on top of the negative index structures. Applying semiconductor nanocrystals would be an alternative approach.

One might question whether the metal nanostructures nullify any attempt to amplify electromagnetic fields using gain materials in their close vicinity because gold nanoparticles are well known to quench fluorescence in an extremely efficient manner [52, 53]. In contrast, however, working solid state and organic semiconductor lasers show that sufficient gain can be provided so that in devices containing metal layers or metal nanoparticles the losses can be compensated. For instance, it has been shown that an optically pumped organic laser comprising a metal-nanoparticle distributed feedback (DFB) grating needs only a marginally increased pumping threshold (compared to organic lasers with metal-free DFB gratings) to be operative [54]. In the case of infrared quantum cascade lasers (QCL), a wave guiding metallic layer was shown to be beneficial for the laser power output [44]. This astonishing result is due to an increased overlap of the surface plasmon guided mode profile with the gain region (the quantum cascade structure, in this case). This overlap offsets the increased losses (compared to a metal-free QCL) resulting from surface plasmon excitation. The net effect is an overall improved laser performance. Accordingly, it should be feasible to use gain materials in order to compensate for the losses introduced by the resonant plasmonic metal nanoparticles in negative index metamaterials.

We want to give a specific example on the basis of the sample shown in FIG. 17a. For the moment, we assume that the metal strips are submerged in a 200 nm thick layer of gain material FIG. 19a. We further assume that the gain material and the metal stripes do not influence each other. This is an assumption that merits further consideration, but for the moment we shall assume that the gain of the material is not influenced by the metal stripes. At the wavelength of least reflectance (due to impedance matching, λ=584 nm), the stripe material shows an absorption of approx. 45%. Applying Lambert-Beer's law and assuming that the absorptive loss should be fully compensated by the 400 nm thick gain layer, it turns out that a gain of $g=3\cdot 10^4$ cm$^{-1}$ is required. Let us further assume that we use Rhodamine 6G dissolved in some optically inert polymer. Rhodamine 6G has a stimulated emission cross section of $\sigma_{SE}=3\cdot 10^{-16}$ cm$^2$ [55] and therefore the concentration of excited dye molecules should be 170 mM. Alternatively, semiconductor nanocrystals (NC) such as CdSe NCs could be applied. It has been shown by Leatherdale et al. [56] that the absorption cross section per NC volume can be as large as $10^5$ cm$^{-1}$. Because g and α are usually of similar magnitude, we conclude, that densely packed nanocrystal films can show gain in the order of g≈$10^5$ cm$^{-1}$.

It is seen that the dye or nanocrystal concentrations need to be quite high to compensate for the losses. However, we have assumed in our rough estimation that the gain of the material in between the metal strips is not affected by the local fields in the vicinity of these metal strips. These fields can be quite high due to nano-plasmonic resonances. In fact, it has been pointed out by Kim et al. [57] and by Lawandy [50] that a gain medium and localized plasmonic resonances may lead to extremely high effective polarizabilities of the combined system. Therefore, the possibility may arise that each pair of gold nanorods as shown in FIGS. 11a-11c, or each strip as in FIG. 17a shows a much larger response to an incoming electric field as the same metal structure in air.

In the example given above we have neglected that the gain material is in intimate contact with the silver stripes. In order to get a better picture, we applied FEMFD simulations on the following model (FIG. 19a): We took the same structure as shown in FIG. 17a, but now we filled the gaps in-between the double silver stripes with a material that provides a fixed amount of gain between 0 and 15·$10^3$ cm$^{-1}$. FIGS. 19b-19d show the transmittance (T), reflectance (R), refractive index (n' and n") and impedance (Z' and Z") as a function of gain (g). We found that at a gain of 12·$10^3$ cm$^{-1}$ the structure becomes transparent (FIG. 19b), while the real part of the refractive index n' is almost unaffected by the gain material (FIG. 19c). Further more, the impedance which has already been matched quite well without the gain medium improves further when gain is applied, i.e. Z'≈1 and Z"≈0 for g=12·$10^{-3}$ cm$^{-1}$ (FIG. 19d). The exact results for a gain of g=12·$10^{-3}$ cm$^{-1}$ are n'=−1.355, n"=−0.008, Z'=0.89, Z"=0.05, T=100.5%, and R=1.6%.

Actually, if a critical magnitude of gain is surpassed, the polarizability and the field enhancement do not depend on nanoparticle shape or material any longer, but are solely limited by gain saturation in the gain medium [50]. At present, we have not included gain saturation in our model. It could be envisioned, that the gain material does not "simply" restore energy, which is lost due to absorption by the metal nanostructures, but it becomes an instrumental element of the negative index material, e.g. heavily increasing the negative response of the pairs of nanorods [50]. This will allow the design of negative index materials of less overall metal content. The density of pairs of rods may be reduced, or the size of each pair may be reduced, while the overall effective negative response of the metamaterial remains strong. This exciting field certainly needs more consideration, which will be given elsewhere.

Very recently, metamaterials have been designed that show a negative real part of the refractive index at the telecom wavelength of 1500 nm or 200 THz. Keeping in mind that it only took 5 years to come from 10 GHz up to 200 THz, we have no doubt that a negative refractive index metamaterial will be soon commercially available also for the visible range. In Phase I we have shown in numerical simulations that two key remedies are now available to overcome major obstacles that currently limit the development of optical negative-index materials (1) impedance matching designs are capable to suppress high reflectance, and (2) gain materials embedded in metallic nanostructures can fully compensate for absorptive losses while still retaining the negative refractive index.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

BIBLIOGRAPHY

The following bibliography includes relevant literature on optical metamaterials, super lens and related techniques.

[1] H. Lamb, "On group-velocity," Proc. Lond. Math. Soc., vol. 1, pp. 473-479, 1904.

[2] A. Schuster, An Introduction to the Theory of Optics. London: Edward Arnold, 1904.

[3] L. I. Mandel'shtam, "Group velocity in crystalline arrays," Zh. Eksp. Teor. Fiz., vol. 15, pp. 475-478, 1945.

[4] V. G. Veselago, "The electrodynamics of substances with simultaneously negative values of □ and μ" Soviet Physics Uspekhi, vol. 10, pp. 509-514, January-February, 1968.

[5] C. L. Holloway, E. F. Kuester, and P. Kabos, "A Double Negative (DNG) Composite Medium Composed of Magnetodielectric Spherical Particles Embedded in a Matrix," IEEE Transactions on Antennas and Propagation, vol. 51, pp. 2596-2603, 2003.

[6] V. A. Podolskiy, L. Alekseev, and E. E. Narimanov, "Strongly anisotropic media: the THz perspectives of left-handed materials," Journal of Modem Optics, vol. 52, pp. 2343, 2005.

[7] H. Kosaka, T. Kawashima, A. Tomita, M. Notomi, and T. Tamamura, "Superprism phenomena in photonic crystals," Physical Review B, vol. 58, pp. 10096-10099, October, 1998.

[8] M. Notomi, "Theory of light propagation in strongly modulated photonic crystals: Refractionlike behavior in the vicinity of the photonic band gap," Physical Review B, vol. 62, pp. 10696-10705, October, 2000.

[9] B. Gralak, S. Enoch, and G. Tayeb, "Anomalous refractive properties of photonic crystals," Journal of the Optical Society of America A, vol. 17, pp. 1012-1020, June, 2000.

[10] C. Luo, S. G. Johnson, and J. D. Joannopoulos, "All-angle negative refraction without negative effective index," Physical Review B, vol. 65, pp. 201104, 2002.

[11] A. Bernier, M. Mulot, M. Swillo, L. Thylen, A. Talneau, and S. Anand, "Negative Refraction at Infrared Wavelengths in a Two-Dimensional Photonic Crystal," Physical Review Letters, vol. 93, pp. 073902, August, 2004.

[12] J. B. Pendry, "Negative Refraction Makes a Perfect Lens," Physical Review Letters, vol. 85, pp. 3966-3969, 2000.

[13] D. R. Smith, D. Schurig, M. Rosenbluth, S. Schultz, S. A. Ramakrishna, and J. B. Pendry, "Limitations on subdiffraction imaging with a negative refractive index slab," Applied Physics Letters, vol. 82, pp. 1506-1508, 2003.

[14] C. Luo, S. G. Johnson, J. D. Joannopoulos, and J. B. Pendry, "Subwavelength imaging in photonic crystals," Physical Review B, vol. 68, pp. 045115, 2003.

[15] Z. Lu, J. A. Murakowski, C. A. Schuetz, S. Shi, G. J. Schneider, and D. W. Prather, "Three-Dimensional Subwavelength Imaging by a Photonic-Crystal Flat Lens Using Negative Refraction at Microwave Frequencies," Physical Review Letters, vol. 95, pp. 153901, October, 2005.

[16] R. A. Depine and A. Lakhtakia, "A new condition to identify isotropic dielectric-magnetic materials displaying negative phase velocity," Microwave and Optical Technology Letters, vol. 41, pp. 315-316, May, 2004.

[17] V. A. Podolskiy and E. E. Narimanov, "Strongly anisotropic waveguide as a nonmagnetic left-handed system," Physical Review B, vol. 71, pp. 201101 (R), 2005.

[18] J. B. Pendry, A. J. Holden, D. J. Robbins, and W. J. Stewart, "Magnetism from Conductors and Enhanced Nonlinear Phenomena," IEEE Transactions on Microwave Theory, vol. 47, pp. 2075-2084, 1999.

[19] J. B. Pendry, A. J. Holden, W. J. Stewart, and I. Youngs, "Extremely Low Frequency Plasmons in Metallic Mesotructures," Physical Review Letters, vol. 76, pp. 4773-4776, 1996.

[20] D. R. Smith, W. J. Padilla, D. C. Vier, S. C. Nemat-Nasser, and S. Schultz, "Composite Medium with Simultaneously Negative Permeability and Permittivity," Physical Review Letters, vol. 84, pp. 4184-4187, 2000.

[21] R. A. Shelby, D. R. Smith, S. C. Nemat-Nasser, and S. Schultz, "Microwave transmission through a two-dimensional, isotropic, left-handed metamaterial," Applied Physics Letters, vol. 78, pp. 489-491, 2001.

[22] R. A. Shelby, D. R. Smith, and S. Schultz, "Experimental verification of a Negative Index of Refraction," Science, vol. 292, pp. 77-79, 2001.

[23] T. J. Yen, W. J. Padilla, N. Fang, D. C. Vier, D. R. Smith, J. B. Pendry, D. N. Basov, and X. Zhang, "Terahertz Magnetic Response from Artificial Materials," Science, vol. 303, pp. 1494-1496, 2004.

[24] H. O. Moser, B. D. F. Casse, O. Wilhelmi, and B. T. Saw, "Terahertz Response of a Microfabricated Rod-Split-Ring-Resonator Electromagnetic Metamaterial," Physical Review Letters, vol. 94, pp. 063901, February, 2005.

[25] Z. Zhang, W. Fan, B. K. Minhas, A. Frauenglass, K. J. Malloy, and S. R. J. Brueck, "Midinfrared Resonant Magnetic Nanostructures Exhibiting a Negative Permeability," Physical Review Letters, vol. 94, pp. 037402, January, 2005.

[26] L. V. Panina, A. N. Grigorenko, and D. P. Makhnovskiy, "Optomagnetic composite medium with conducting nanoelements," Physical Review B, vol. 66, pp. 155411, 2002.

[27] S. Linden, C. Enkrich, M. Wegener, J. Zhou, T. Koschny, and C. M. Soukoulis, "Magnetic Response of Metamaterials at 100 Terahertz," Science, vol. 306, pp. 1351-1353, 2004.

[28] C. Enkrich, M. Wegener, F. Perez-Willard, S. Linden, J. Zhou, T. Koschny, and C. M. Soukoulis, "Optimizing the design parameters for split-ring resonators at telecommunication wavelengths," presented at International Conference on Quantum Electronics and Laser Science (QELS), Baltimore (USA), 2005.

[29] A. N. Lagarkov and A. K. Sarychev, "Electromagnetic properties of composites containing elongated conducting inclusions," Physical Review B, vol. 53, pp. 6318-6336, March, 1996.

[30] V. A. Podolskiy, A. K. Sarychev, and V. M. Shalaev, "Plasmon Modes in Metal Nanowires and Left-Handed Materials," Journal of Nonlinear Optical Physics & Materials, vol. 11, pp. 65-74, 2002.

[31] V. A. Podolskiy, A. K. Sarychev, and V. M. Shalaev, "Plasmon modes and negative refraction in metal nanowire composites," Optics Express, vol. 11, pp. 735-745, 2003.

[32] V. A. Podolskiy, A. K. Sarychev, E. E. Narimanov, and V. M. Shalaev, "Resonant light interaction with plasmonic nanowire systems," Journal of Optics A, vol. 7, pp. S32-S37, January, 2005.

[33] N. Engheta, A. Salandrino, and A. Alu, "Circuit Elements at Optical Frequencies: Nanoinductors, Nanocapacitors, and Nanoresistors," Physical Review Letters, vol. 95, pp. 095504, August, 2005.

[34] V. M. Shalaev, W. Cai, U. K. Chettiar, H. K. Yuan, A. K. Sarychev, V. P. Drachev, and A. V. Kildishev, "Negative index of refraction in optical metamaterials," http://www.arxiv.org/abs/physics/0504091, Apr. 13, 2005.

[35] V. M. Shalaev, W. Cai, U. K Chettiar, H. K. Yuan, A. K. Sarychev, V. P. Drachev, and A. V. Kildishev, "Negative index of refraction in optical metamaterials," Optics Letters, vol. 30, pp. 3356-3358, December, 2005.

[36] A. N. Grigorenko, A. K. Geim, H. F. Gleeson, Y. Zhang, A. A. Firsov, I. Y. Khrushchev, and J. Petrovic, "Nanofabricated Media with negative permeability at visible frequencies," Nature, vol. 438, pp. 335-338, November, 2005.

[37] V. P. Drachev, W. Cai, U. Chettiar, H. K. Yuan, A. K. Sarychev, A. V. Kildishev, G. Klimeck, and V. M. Shalaev, "Experimental verification of an optical negative-index material," Laser Physics Letters, vol. in press, 2005.

[38] A. V. Kildishev, W. Cai, U. K. Chettiar, H. K. Yuan, A. K. Sarychev, V. P. Drachev, and V. M. Shalaev, "Negative Refractive Index in Optics of Metal-Dielectric Composites," Journal of the Optical Society of America B, vol. in press, March, 2006.

[39] D. R. Smith, S. Schultz, P. Markos, and C. M. Soukoulis, "Determination of effective permittivity and permeability of metamaterials from reflection and transmission coefficients," Physical Review B, vol. 65, pp. 195104, 2002.

[40] F. Falcone, T. Lopetegi, M. A. G. Laso, J. D. Baena, J. Bonache, M. Beruete, R. Marques, F. Martin, and M. Sorolla, "Babinet Principle Applied th the Design of Metasurfaces and Metamaterials," Physical Review Letters, vol. 93, pp. 197401, November, 2004.

[41] S. Zhang, W. Fan, N. C. Panoiu, K. J. Malloy, R. M. Osgood, and S. R. J. Brueck, "Experimental Demonstration of Near-Infrared Negative-Index Metamaterials," Physical Review Letters, vol. 95, pp. 137404, September, 2005.

[42] S. Zhang, W. Fan, K. J. Malloy, and S. R. J. Brueck, "Near-infrared double negative metamaterials," Optics Express, vol. 13, pp. 4922-4930, June, 2005.

[43] S. Zhang, W. Fan, K. J. Malloy, S. R. J. Brueck, N. C. Panoiu, and R. M. Osgood, "Demonstration of metal-dielectric negative-index metamaterials with improved performance at optical frequencies," Journal of the Optical Society of America B, vol. in press, March, 2006.

[44] A. Tredicucci, C. Gmachl, F. Capasso, A. L. Hutchinson, D. L. Sivco, and A. Y. Cho, "Single-mode surface-plasmon laser," Applied Physics Letters, vol. 76, pp. 2164-2166, 2000.

[45] A. N. Sudarkin and P. A. Demkovich, "Excitation of surface electromagnetic waves on the boundary of a metal with an amplifying medium," Soviet Physics. Technical Physics, vol. 34, pp. 764-766, 1989.

[46] M. P. Nezhad, K. Tetz, and Y. Fainman, "Gain assisted propagation of surface plasmon polaritons on planar metallic waveguides," Optics Express, vol. 12, pp. 4072-4079, August, 2004.

[47] I. Avrutsky, "Surface plasmons at nanoscale relief gratings between a metal and a dielectric medium with optical gain," Physical Review B, vol. 70, pp. 155416, 2004.

[48] J. Seidel, S. Grafström, and L. Eng, "Stimulated Emission of Surface Plasmons at the Interface between a Silver Film and an Optically Pumped Dye Solution," Physical Review Letters, vol. 94, pp. 177401, May, 2005.

[49] D. J. Bergman and M. I. Stockman, "Surface Plasmon Amplification by Stimulated Emission of Radiation:

Quantum Generation of Coherent Surface Plasmons in Nanosystems," Physical Review Letters, vol. 90, pp. 027402, 2002.

[50] N. M. Lawandy, "Localized surface plasmon singularities in amplifying media," Applied Physics Letters, vol. 85, pp. 5040-5042, 2004.

[51] S. A. Ramakrishna and J. B. Pendry, "Removal of absorption and increase in resolution in a near-field lens via optical gain," Physical Reveiw B, vol. 67, pp. 201101, 2003.

[52] E. Dulkeith, A. C. Morteani, T. Niedereichholz, T. A. Klar, J. Feldmann, S. A. Levi, F. C. J. M. van Veggel, D. N. Reinhoudt, M. Möller, and D. I. Gittins, "Fluorescence Quenching of Dye Molecules near Gold Nanoparticles: Radiative and Nonradiative Effects," Physical Review Letters, vol. 89, pp. 203002, 2002.

[53] H. Imahori, Y. Kashiwagi, Y. Endo, T. Hanada, Y. Nishimura, I. Yamazaki, Y. Araki, O. Ito, and S. Fukuzumi, "Structure and Photophysical Properties of Porphyrin-Modified Metal Nanoclusters with Different Chain Lengths," Langmuir, vol. 20, pp. 73-81, 2004.

[54] J. Stehr, F. Schindler, J. Crewett, R. Sperling, G. von Plessen, U. Lemmer, J. M. Lupton, T. A. Klar, J. Feldmann, A. W. Holleitner, M. Forster, and U. Scherf, "A low threshold polymer laser based on metallic nanoparticle gratings," Advanced Materials, vol. 15, pp. 1726, 2003.

[55] W. Holzer, H. Gratz, T. Schmitt, A. Penzkofer, A. Costela, I. Garcia-Moreno, R. Sastre, and F. J. Duarte, "Photophysical characterization of rhodamine 6G in a 2-hydroxyethyl-methacrylate methyl-methacrylate copolymer," Chemical Physics, vol. 256, pp. 125-136, 2000.

[56] C. A. Leatherdale, W. K. Woo, F. V. Mikulec, and M. G. Bawendi, "On the Absorption Cross Section of CdSe Nanocrystal Quantum Dots," Journal of Physical Chemistry B, vol. 106, pp. 7619-7622, 2002.

[57] W. Kim, V. P. Safonov, V. M. Shalaev, and R. L. Armstrong, "Fractals in Microcavities: Giant Coupled, Multiplicative Enhancement of Optical Responses," Phys. Rev. Lett, vol. 82, pp. 4811-4814, 1999.

[58] J. Justin Gooding, "Review: Biosensor technology for detecting biological warfare agents: Recent progress and future trends," Analytica Chimica Acta, vol. 559, pp. 137-151, 2006.

The invention claimed is:

1. A near field lens system comprising:
a metal-dielectric film having a first surface and a second surface, the film adapted to image local electric or magnetic fields from the first surface to the second surface,
a first layer of a semiconductor medium abutting the first surface,
a second layer of a semiconductor medium abutting the second surface, and
a surface-enhanced Raman scattering (SERS) substrate abutting the first layer of the semiconductor medium opposite the first surface.

2. The lens of claim 1 wherein the metal-dielectric film comprises $Ag$—$SiO_2$.

3. The lens of claim 1 wherein the semiconductor medium comprises Si.

4. The lens of claim 1 wherein the semiconductor medium comprises SiC.

5. The lens of claim 1 further comprising a micro fluidic channel abutting the second layer of the semiconductor medium opposite the second surface.

6. A near-field imaging system for use with a selected wavelength of illuminating light, the system comprising:
an imaging device having a first surface and a second surface, the device adapted to image local electric or magnetic fields from the first surface to the second surface; and
a surface-enhanced Raman scattering (SERS) substrate disposed facing the first surface and within the wavelength of the illuminating light of the first surface.

7. The near-field imaging system according to claim 6, wherein the imaging device includes a negative-index periodic metamaterial comprising metal and dielectric.

\* \* \* \* \*

UNITED STATES PATENT AND TRADEMARK OFFICE
CERTIFICATE OF CORRECTION

PATENT NO.        : 8,599,489 B2                              Page 1 of 1
APPLICATION NO.   : 12/449604
DATED             : December 3, 2013
INVENTOR(S)       : Vladimir M. Shalaev et al.

It is certified that error appears in the above-identified patent and that said Letters Patent is hereby corrected as shown below:

Title Page

Item (75), replace "Alexander P. Kildishev" with
-- Alexander V. Kildishev --.

Signed and Sealed this
Sixth Day of May, 2014

Michelle K. Lee
*Deputy Director of the United States Patent and Trademark Office*